(12) United States Patent
Coward

(10) Patent No.: US 11,407,172 B2
(45) Date of Patent: Aug. 9, 2022

(54) RECOATER USING ALTERNATING CURRENT TO PLANARIZE TOP SURFACE OF POWDER BED

(71) Applicant: Powder Motion Labs, LLC, Rolla, MO (US)

(72) Inventor: Connor L. Coward, O'Fallon, MO (US)

(73) Assignee: Powder Motion Labs, LLC, Rolla, MO (US)

( * ) Notice: Subject to any disclaimer, the term of this patent is extended or adjusted under 35 U.S.C. 154(b) by 346 days.

(21) Appl. No.: 16/823,065

(22) Filed: Mar. 18, 2020

(65) Prior Publication Data

US 2021/0291446 A1 Sep. 23, 2021

(51) Int. Cl.
| | | |
|---|---|---|
| *B29C 64/153* | (2017.01) | |
| *B29C 64/393* | (2017.01) | |
| *B33Y 30/00* | (2015.01) | |
| *B33Y 50/02* | (2015.01) | |

(Continued)

(52) U.S. Cl.
CPC ............ *B29C 64/218* (2017.08); *B22F 10/00* (2021.01); *B29C 64/153* (2017.08);
(Continued)

(58) Field of Classification Search
CPC ... B29C 64/188; B29C 64/153; B29C 64/165; B29C 64/214; B29C 64/218;
(Continued)

(56) References Cited

U.S. PATENT DOCUMENTS

| | | |
|---|---|---|
| 4,357,234 A | 11/1982 | Inculet et al. |
| 4,938,816 A | 7/1990 | Beaman et al. |

(Continued)

FOREIGN PATENT DOCUMENTS

| | | |
|---|---|---|
| CN | 105798298 | 6/2016 |
| CN | 105642900 | 7/2016 |

(Continued)

OTHER PUBLICATIONS

Najarajan, Development of Micro Selective Laser Melting: The State of the Art and Future Perspectives, Research Additive Manufacturing Review, Jul. 2, 2019, vol. 5, Issue 4, Aug. 2019, pp. 702-720.

*Primary Examiner* — Niki Bakhtiari
*Assistant Examiner* — Nicholas J Chidiac
(74) *Attorney, Agent, or Firm* — Harness, Dickey & Pierce, P.L.C.; Anthony Fussner

(57) ABSTRACT

A system for recoating a powder bed includes a platform holding a powder bed, a brush and an electrode assembly including an electrode and insulating shield. After powder is distributed on the powder bed the top surface of the powder bed is smoothed by the brush. A voltage supply produces a high voltage alternating current and communicates with the powder bed and the electrode. When the electrode assembly is positioned over the powder bed, the shield is between the electrode and powder bed top surface. The voltage supply produces a high voltage alternating current that creates an alternating electric field between the electrode and the powder bed that causes the powder on the top surface to oscillate in a region between the shield and the bed and then reposition themselves on the bed such that the top layer of the powder bed is smoother than it was prior to when the powder particles began oscillating.

18 Claims, 30 Drawing Sheets

(51) Int. Cl.
*B29C 64/218* (2017.01)
*B29C 64/214* (2017.01)
*B33Y 10/00* (2015.01)
*B22F 10/00* (2021.01)
*B22F 10/10* (2021.01)

(52) U.S. Cl.
CPC .......... *B29C 64/214* (2017.08); *B29C 64/393* (2017.08); *B33Y 10/00* (2014.12); *B33Y 30/00* (2014.12); *B33Y 50/02* (2014.12); *B22F 10/10* (2021.01)

(58) Field of Classification Search
CPC ....... B29C 64/205; B29C 64/30; B22F 10/14; B22F 10/28; B22F 12/60; B22F 12/63; B22F 12/37
See application file for complete search history.

(56) References Cited

U.S. PATENT DOCUMENTS

| | | |
|---|---|---|
| 6,066,285 A | 5/2000 | Kumar |
| 8,124,192 B2 | 2/2012 | Paasche et al. |
| 9,346,127 B2 | 5/2016 | Buller et al. |
| 9,586,290 B2 | 3/2017 | Buller et al. |
| 10,035,219 B2 | 7/2018 | Coward |
| 10,213,797 B2 | 2/2019 | Coward et al. |
| 10,226,780 B2 | 3/2019 | Coward et al. |
| 10,272,618 B2 | 4/2019 | Hays et al. |
| 2017/0368718 A1 | 12/2017 | Marduel |
| 2018/0243768 A1* | 8/2018 | Coward ................ B05B 7/1445 |
| 2018/0243769 A1* | 8/2018 | Coward ................ B05B 5/0418 |
| 2019/0283982 A1 | 9/2019 | Coward |
| 2019/0315064 A1 | 10/2019 | Budge et al. |

FOREIGN PATENT DOCUMENTS

| | | |
|---|---|---|
| DE | 102016213901 | 2/2018 |
| EP | 0179688 | 4/1986 |
| EP | 1525969 | 4/2005 |
| EP | 1526214 | 4/2005 |
| EP | 1678372 | 7/2006 |
| FR | 2655036 | 5/1991 |
| WO | WO2016205719 | 12/2016 |
| WO | WO2017143145 | 8/2017 |

* cited by examiner

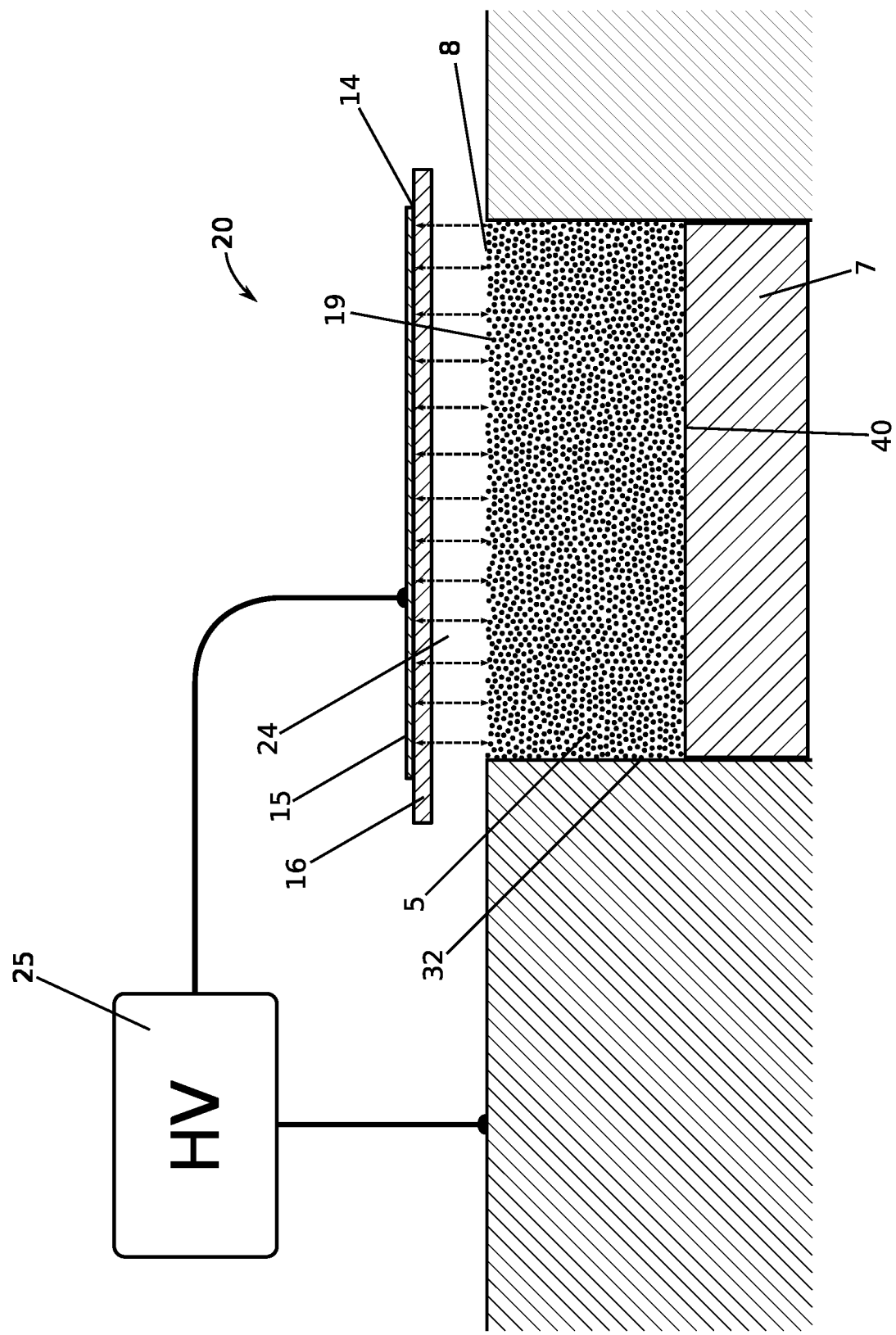

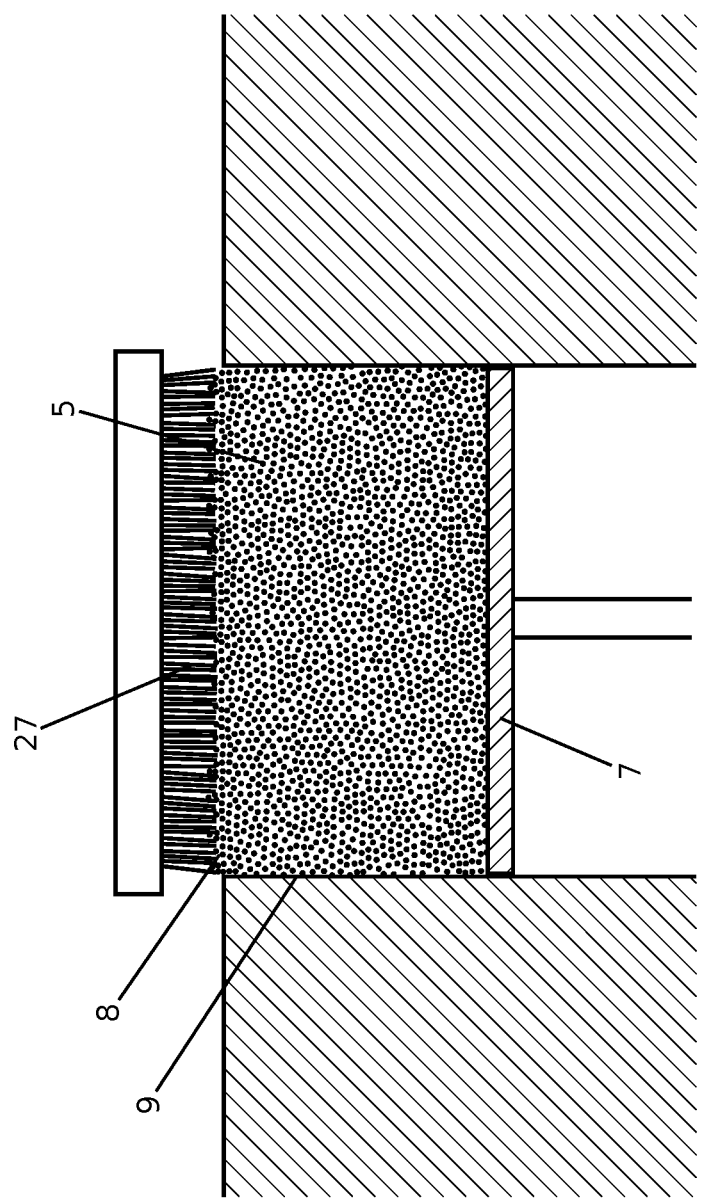

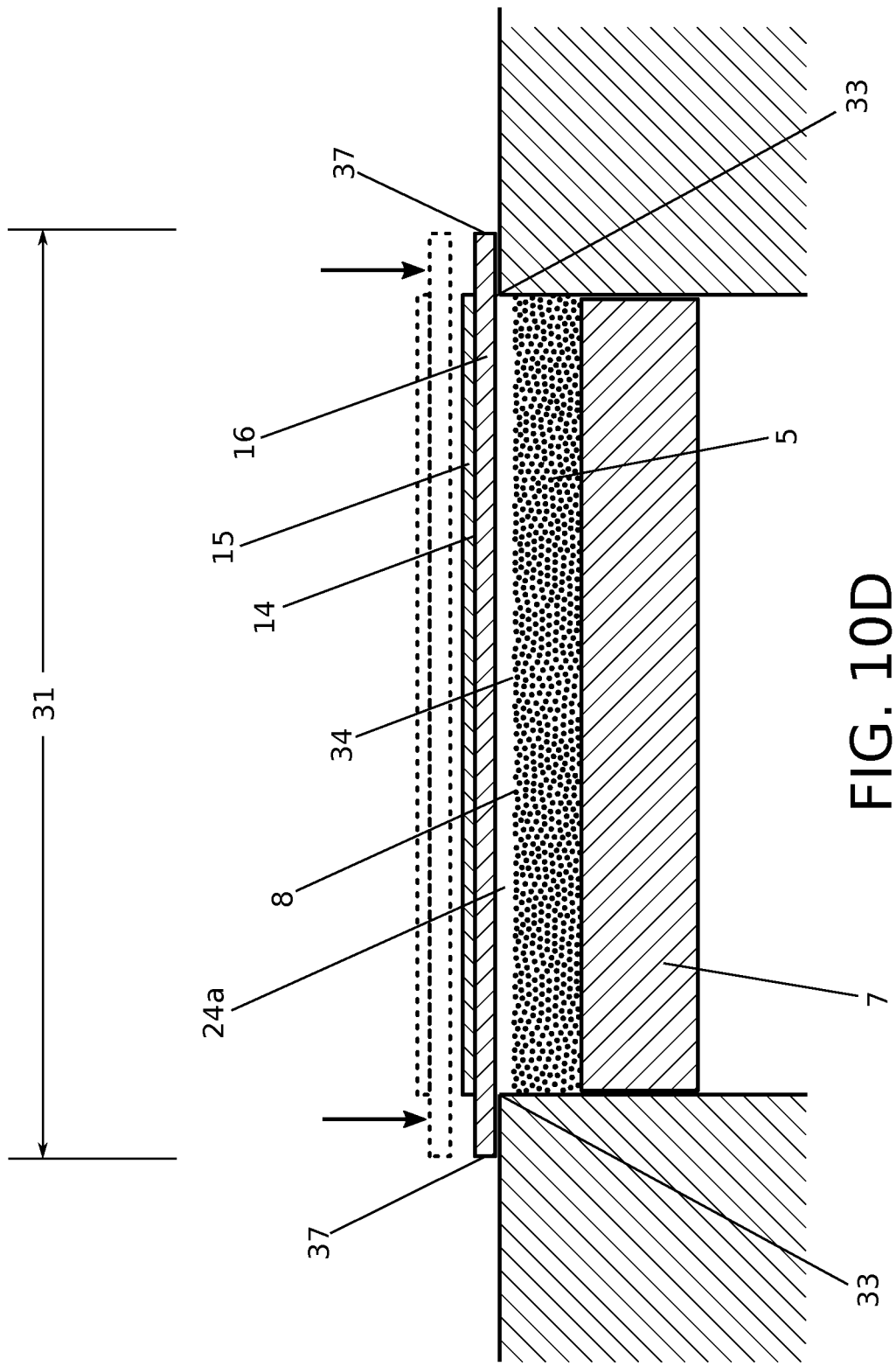

US 11,407,172 B2

RECOATER USING ALTERNATING CURRENT TO PLANARIZE TOP SURFACE OF POWDER BED

CROSS REFERENCE TO RELATED APPLICATION

Not applicable

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to powder leveling devices and more specifically relates to powder bed recoating devices useful for powder bed fusion processes.

BACKGROUND OF THE INVENTION

It is known to make 3-dimensionally ("3-D") printed parts using powder bed fusion ("PBF") techniques. There are various types of PBF techniques including direct metal laser sintering (DMLS), electron beam melting (EBM), selective laser melting (SLM), selective heat sintering (SHS), selective laser sintering (SLS) and direct metal laser melting (DMLM). In PBF, 3-D parts are formed layer-by-layer using a heat source such as a laser or electron beam (in the case of heat fused metal and nylon powders) and a thermal printhead (in the case of chemically fused plastic powders) to selectively fuse particles in a powder bed. The basic steps of PBF include: 1) spreading a layer, typically around 0.1 mm thick of powder material over a build platform; 2) directing heat energy or chemical binder to a target area on the build platform and fusing a first layer of the product to be built; 3) indexing the build platform down in an amount correlated to building the next layer; 4) spreading a new layer of powder across the previous layer and using a roller or a blade-shaped device (the blade-shaped device being frequently referred to as a scraper, but sometimes being referred to as wiper); 5) directing heat energy or chemical binder to a target area on the new layer of powder added to the build platform and fusing the next layer of the product; and 6) repeating the process until the entire product is finished.

FIG. 1 is an exemplary depiction of the components utilized in a prior art PBF device employing a heat energy source. As shown in FIG. 1 a basic PBF process begins with a build platform (a/k/a solid substrate or build plate) 7. A thin layer of powder is then spread across the substrate 7 to create a powder bed 5. A heat source (e.g. laser or electron beam) 1 above the substrate emits a beam 2 and scans a pattern corresponding to the cross section of the part 6, thereby selectively sintering or melting the powder in powder bed 5 and fusing it to the substrate 7 below. For each subsequent layer, the substrate 7 is lowered and more powder from powder supply 3 is pushed up by elevator 28 of new powder reservoir 9 and then spread across the top 8 of the powder bed 5 in a powder bed reservoir 32 on substrate 7. In FIG. 1 a roller 4 is shown as the chosen device to spread powder on the powder bed. The heat source 1 then travels horizontally over the next layer of the part, focally fusing via sintering or melting the newly deposited powder on powder bed 5 together with the previous layer to create the next layer of the part 6.

Similar to PBF using a heat source is the process of binder jetting. Binder jetting creates 3D printed objects using a powder bed, however with binder jetting a liquid binder is used to selectively fuse the powder instead of heat energy. FIG. 2 is an exemplary depiction of the components utilized in a prior art binder jetting device. As indicated by the identity of structure reference numerals between FIGS. 1 and 2, many of the components used in binder jetting are similar to those use in heat energy PBF. With binder jetting, the liquid binder 10 contained in a binder reservoir 11 is focally jetted via a printhead 12 into the powder in powder bed 5 in desired locations and allowed to dry or cure, creating a solid part 6 where the liquid was placed. In applying binder fluid, printhead 12 moves in horizontal directions (representatively shown by arrows 13a, 13b) over powder bed 5. In FIG. 2 a roller 4 is again shown as the chosen device to spread powder on the powder bed. Many of the concepts, issues and solutions referable to powder bed fusion involving focally directed heat energy apply equally to binder jetting. Therefore, as used herein, the term "PBF," unless otherwise indicated, applies with equal force to powder bed techniques involving heat fusion and binder jetting.

In order to maximize the integrity of the 3-D build that is the subject of PBF build techniques, it is imperative that a very smooth and even layer of powder be spread over the powder bed 5 on the build plate 7. In current PBF systems, the component that performs the smoothing and evening of the surface powder layer is called a "recoater." In the prior art PBF system, a dispenser meters a determined amount of powder 3 from a new powder reservoir 9 for each new layer. After the metering step, the recoater spreads and planarizes the metered powder. The spreading and planarizing is typically performed using a scraper or roller that travels horizontally across the top surface 8 of the powder bed 5. In the exemplary prior art embodiments shown in FIGS. 1 and 2, the recoater is shown in the form of roller 4. After the heat source 1 (or inkjet 12) is finished fusing the powder for each layer, the build plate 7 is lowered by one layer height. This lowering of the build plate results in a vertical gap between the bottom of the recoater and the top of the previous layer. The recoater will move horizontally across the newly lowered build plate and while doing so will meter powder onto the previous layer. With a typical prior art recoater, a small amount of excess powder will be metered onto the build plate for each layer to ensure full build-plate coverage. Any excess powder will need to be removed from the surface. Excess powder that is removed is collected in a third reservoir beyond the build plate.

As mentioned, in many PBF systems the recoater uses scrapers or rollers to planarize the powder bed surface and remove excess powder from it. These scrapers and rollers work via contact with the powder bed surface. Thus, the typical scraper is simply a blade or wiper that pushes or pulls powder over the bed. The typical roller is a rotating drum. The leading face of the roller can rotate upwardly from the powder bed or downwardly into the powder bed as the recoater moves horizontally over the powder bed.

There are issues with the prior art recoaters that use contact planarizing tools to smooth and flatten the working surface of the powder bed. One issue results from the fact that as a part is being built during PBF, the part being built or some portion of the part is subjected to high amounts of heat energy. As the part being built (a/k/a the "working product") heats and cools it will twist and warp. (Twisting and warping is less of an issue with binder jetting processes as these processes typically occur at room temperature.) In some cases, sections of the part being produced bend upwards. When this happens the hardened part can project into the path of the roller or scraper and physically interfere with the planarizing of the powder work surface. When this physical interference occurs, the roller or scraper can be damaged. When damage to the roller or scraper occurs, streaks and improper powder placement occur in the working powder surface, which in turn results in defective and failure-prone 3-D builds.

In the case of recoaters employing scrapers and rollers, the resulting damage to the 3-D part being built will depend upon the type of scraper or roller employed. Rollers and scrapers can be hard or soft. Hard scrapers, for example, are made from materials like hardened steel or ceramics that are more resistant to wear and damage as compared to soft scrapers. If the part warps into the path of a hard scraper, then the part can be torn off the build plate or the scraper carriage may entirely stall, causing the build to fail.

Soft scrapers, on the other hand, are made from soft materials like silicone or rubber. They are more prone to wear, so they need to be replaced often. If a part warps upward into the path of a soft scraper, usually a notch is worn into the scraper. This notch leaves a row of excess powder (a streak) over the build platform, causing defects in parts, potentially leading to the entire build to fail. FIG. 3A depicts how a warped part 6 with elements 18 sitting proud of the top surface 8 of the powder bed 5 can interfere with the travel path of a scraper 41, resulting in damage to the scraper 41. FIG. 3B depicts the scraper 41 with resulting scraper defects 42 that result in bumps or streaks in the powder bed 5. The scraper defects 42 were caused by the scraper's contact with a warped portion 18 of the build part 6 while moving across the powder bed 5. FIG. 3C depicts a powder bed 5 with powder bed defects 43 in the form bumps or streaks in it due to recoating with the damaged scraper 41. In addition to the problem of streaking, a damaged scraper or roller, whether hard or soft, can introduce contaminants into the part being built. Such contamination can drastically affect the part's material properties and part strength.

WO 2017/143145 is a recent publication that proposes to remedy the above issues found in prior art recoaters employing scrapers by outfitting the recoater with both a hard and soft scraper. An alternative option to using a scraper or roller to planarize the working powder bed is to use a tamper to level the powder. Tamping the powder involves positioning a tamper plate above the bed and lowering it down one or more times on the powder bed to make it flat. Thus, with a tamper the leveling action is changed from horizontal to vertical. However, this option is not a solution to the problems caused by warped parts as any part warping above the bed level will contact the tamper. A tamper system also requires additional moving parts.

It is also known to use a brush to level and spread build powder. A brush is made of a large plurality of flexible bristles, whose flexibility can be tailored to an intended purpose. Being flexible, the bristles of a brush may move to accommodate a part warping into the path of the brush. Hence, a brush is not prone to the same notching or wear as a scraper or roller. For a brush to be useful for these purposes, its bristles typically must be of uniform length and rigidity, as well as straight and parallel with each other. Otherwise the brush will not create a uniform surface texture. Generally, the finer the bristles of the brush, the smoother the finish it will leave on the top surface of the powder bed. However, the finer a brush bristle is, the more prone it is to kink or misalign with other bristles of the brush. In addition, the finer the bristles of a brush, the likelihood increases that the brush will shed a bristle and contaminate the powder bed. FIGS. 9A-9B depict how a powder bed is planarized using a brush 27. Even when made to exacting standards, brushes leave surface marks in the form of small stroke marks (grooves or trenches) 46 generally longitudinally aligned with the direction of brush travel in the powder bed surface. These brush marks can affect build integrity.

Another proposed option for leveling a powder bed is to use a vibrator to vibrate the powder bed to make the powder resident thereon level. Current vibration systems however are difficult to reliably control. One reason for this is because the amount of powder on the powder bed changes throughout the build process. Hence, the applied vibration forces will affect the powder bed differently at different stages of the process. In addition, introducing vibration sources into a build process requiring precision alignment and amongst the heat sources (or inkjets), beam guidance mechanisms, system sensors, the build and the build platform requires constant supervision to make sure the build environment has not been adversely affected by vibrations. Aside from alignment issues, vibration mechanisms take a heavy toll on lasers and laser optical equipment.

The above-described methods of planarizing a PBF powder bed all involve mechanical contact between a tool and the powder or powder bed. At least one non-contact method has been proposed for leveling PBF powder beds. This solution is proposed in U.S. Pat. No. 9,346,127, which discloses leveling the powder bed using motive air or gas. This solution has deficits as well. On one hand, it requires an air or gas handling system to deliver the motive air or gas. Additionally, in order to make sure a powder surface is uniformly smooth, particularly across a relative broad surface, leveling via gas or air requires engineering of the currents so as not to cause peaks and valleys in the working powder bed.

In terms of non-contact methods of moving powder generally—as opposed to leveling powder beds, several techniques are known in the prior art. For example, the aforementioned U.S. Pat. No. 9,346,127, suggests using a sucking force to remove excess powder from the powder bed when making a 3-D product. This patent also discloses using magnetic and electrostatic attractive forces to pick up and remove the excess powder. Other references also discuss using electrostatic forces to pick up powder and then dispense it. See for instance U.S. Pat. No. 8,124,192, U.S. Published Patent Application No. 20190315064A1, German Patent No. DE102016213901A1, U.S. Pat. No. 6,066,285 and Chinese Patent Nos. CN10564200A and CN105798298. Applicant's U.S. Pat. Nos. 10,213,797, 10,035,219, 10,226, 780 and U.S. Published Patent Application No. 20190283982 disclose use of electrostatic and alternating current fields to manipulate powders for purposes of dispensing them for metal additive manufacturing. EP 1525969A1 discloses a device for dispersing and homogenizing powder being dropped onto and traveling on the surface of a conveyor belt. In this last reference powder is delivered either via gravity or the conveyor belt between two electrodes with dielectric plates. The electrodes are connected to a generator producing alternating high voltage. The dispersed and conveyed powder is then impregnated in a fibrous or porous material.

In some cases, the application of an electric field to powders used in additive manufacturing processes beneficially compacts powder and reduces powder motility. See, for instance, WO2016205719A1. An early patent in this area, U.S. Pat. No. 4,938,816 discloses embodiment apparatuses and methods for making the powder dispensed onto the build target area more dense. In one embodiment of this patent, polarizable powder is dispensed upon a target area and an electric field is produced near the target area. The electric field produced by opposing plates induces increased density in the target area of the powder by virtue of the polarizing forces. Compacting powder may be beneficial at certain stages of the PBF process, such as after leveling. However, during the dispersal and planarizing process, it is desirable that the powder be loose and capable of being contoured. Thus, compacting the powder bed is not desirable prior to leveling as powders driven into deep compaction via application of an electric field can become refractory to planarizing procedures due to their rigid orientation.

In view of the deficits of the prior art powder recoater technologies, an improved powder recoater is desired.

SUMMARY OF THE INVENTION

In a first preferred embodiment, the present invention is directed to an improved recoater that uses non-contact methods to level the powder bed. In particular respect the various embodiments of the invention encompass devices, systems and methods that use electrostatically induced powder oscillation to smooth the top surface of the powder bed. In general terms, embodiment inventions comprise positioning an electrode about 2 millimeters above the powder bed surface. A high-voltage alternating-current signal, preferably ranging from about 1500 volts to 2500 volts is applied between the electrode and the powder bed. An insulator (dielectric plate) is situated between the electrode and powder bed, preventing direct arcing. The high-voltage alternating current signal creates an alternating polarity electric field in the region between the electrode and the powder bed.

The alternating electric field created within the space between the insulator and the powder bed causes the powder particles on the top of the powder bed to develop an electrical surface charge and be subject to an alternating electrostatic force that causes the powder particles to oscillate between the powder bed and the insulator. Adjusting the amplitude of the alternating potential high voltage signal applied to the electrode adjusts the oscillation rate. Increasing the amplitude of the alternating potential high voltage signal will increase the electric force experienced by the particles, causing them to oscillate faster. The oscillation motion of the powder particles is three-dimensional. Oscillating particles have a strong tendency to move toward regions of lower oscillating particle concentration due to inter-particle forces and collisions. The random oscillation created by the alternating potential has the effect of leveling the distribution of powder particles on the top surface of the powder bed and smoothing the surface.

The key to the invention is that while positioned over the top surface of the powder bed layer, the voltage supply produces a high voltage alternating current signal that results in a high-strength alternating electric field between the electrode and the newly-applied powder bed layer. It has been discovered that the alternating polarity electric field causes at least some of the individual powder particles of the top of the powder bed layer to oscillate in the region between the dielectric member and the powder bed. After a period of oscillation, the oscillating particles reposition themselves on the newly-applied powder bed layer in a manner that smooths the top surface of the newly-applied powder bed layer.

In a most simplistic embodiment, the invention is directed to a system and method for recoating a powder bed. An embodiment system comprises a build platform holding a powder bed. The powder bed has a top surface that has a plurality of powder bed particles. The system includes an electrode assembly with an electrode and a non-conductive dielectric shield (insulator). A voltage supply produces a high voltage alternating current signal and is in electrical communication with the powder bed and the electrode. The electrode assembly is positionable over the powder bed. When the electrode assembly is positioned over the powder bed, the non-conductive dielectric shield is located between the electrode and the top surface of the powder bed.

When the voltage supply produces a high voltage alternating current signal, it results in the creation of an alternating electric field (a/k/a alternating polarity electric field) between the electrode and the powder bed. That alternating electric field causes the plurality of powder particles on the top of the powder bed to oscillate in a region between the non-conductive dielectric shield and the top surface of the powder bed. The oscillating powder particles then reposition themselves on the powder bed such that the top layer of the powder bed is smoother than it was prior to when the powder particles began oscillating.

An embodiment method for recoating a powder bed holding a supply of powder particles includes the following actions. First, an amount of powder material is dispensed onto the powder bed to create a first powder bed layer. The powder bed layer includes a top surface with a plurality of powder particles. A provided high voltage supply produces a high voltage alternating current signal. The voltage supply is in electrical communication with the powder bed and an electrode of an electrode assembly having a non-conductive dielectric shield. Preferably, the powder bed is in electrical communication with earth ground. The powder bed is commonly contained by an enclosure and often the enclosure material is metal or otherwise electrically conductive. In such configurations, it is advantageous to connect the powder bed enclosure to earth ground, thereby grounding the powder bed itself. One terminal of the voltage supply is then connected to the powder bed enclosure, while the other terminal is in electrical communication with the electrode in the electrode assembly. Grounding the powder bed ensures that the powder particles will not experience electric forces, except those produced by the electric field created between the electrode assembly and powder bed. Grounding the powder bed also ensures that high voltage is isolated to only the electrode and conductors carrying current to the electrode, thus reducing the chance of arcing or electromagnetic noise and interference with other sensitive instruments and equipment nearby.

In use, the electrode assembly is positioned in proximity to the powder bed layer such that the non-conductive dielectric shield is situated between the electrode and the top surface of the powder bed layer. The voltage supply produces a high voltage alternating current signal that results in the creation of an electric field of alternating polarity between the electrode and the powder bed layer. That alternating electric field causes the plurality of powder particles to: i) oscillate in a region between the non-conductive dielectric shield and the powder bed; and ii) then reposition themselves on the powder bed such that the top surface is smoother than it was prior to when the powder particles began oscillating.

In a more specific application of the inventive concepts, the invention is directed to a system and method for creating a three-dimensional object. An embodiment invention includes dispensing a first amount of powder material onto a work surface to form a first powder bed layer. After dispensing the first amount of powder material, an energy beam or chemical binder is directed on to the first powder bed layer to generate at least a portion of the three-dimensional object from a portion of the first powder bed layer. After this step, a second amount of powder material is dispensed onto the first powder bed layer to create a second powder bed layer having a top surface. The second powder bed layer comprises individual powder particles.

The embodiment system carrying out the method includes a voltage supply producing a high voltage alternating current signal. The voltage supply is in electrical communication with the second powder bed layer and an electrode of an electrode assembly having a non-conductive dielectric shield. The electrode assembly is positioned in proximity to the second powder bed layer such that the non-conductive dielectric shield is located between the electrode and the top surface of the second powder bed layer. The system causes the voltage supply to produce a high voltage alternating current signal that results in the creation of an alternating electric field between the electrode and the second powder bed layer. That electric field with alternating polarity causes at least some of the individual powder particles of the second powder bed layer to oscillate in the region between the dielectric member and the second powder bed layer. The oscillation induced in the powder particles results in the particles repositioning themselves on the second powder bed layer in a manner that levels and smooths the top surface of the second powder bed layer. An energy beam or chemical binder is directed on to the second powder bed layer to generate at least a portion of the three-dimensional object from a portion of the second powder bed layer.

In contrast to prior art systems, in the embodiment systems and methods the powder bed itself is conductive and grounded and therefore it forms the lower electrode. Hence, no separate opposing electrode is necessary. In the embodiment systems and method, the electrode assembly is moved over the powder bed to subject the powder particles to the effect of the alternating electric field. The measured application of the alternating current induced electric field to conductive and grounded powder does not infiltrate the powder bed so as to cause deep compaction of the powder in a manner that counters the leveling effect of the oscillation. Instead, the alternating current induced electric field creates a layer of flat loose powder atop the powder bed without the indicia of handling left by contact recoating methods.

Variations of the embodiment system and method are more particularly described herein. In one embodiment of the invention the electric field applied to the powder bed can be applied by way of a stationary electrode assembly. In another embodiment, the electrode assembly can be in motion while the electric field is applied. The motion of the electrode assembly can be linear, orbitally sweeping (circular) or otherwise. A system or method embodying the invention can include as an adjunct one of the aforementioned contact implements, (e.g., roller, scraper, brush, etc.) for an implementing recoating (planarizing) step in advance or preparatory to the non-contact methods described herein. Additionally, embodiment recoater systems can be easily manufactured and added to existing PBF systems as aftermarket solutions to provide improved powder bed recoating. Though, the described recoating systems and methods have particular applicability with regard to PBF processes, the inventive embodiments can be used in any process requiring leveling of a powder bed.

Additionally, the embodiment systems and methods avoid the issues caused by build warping. Any part warping above the powder bed level does not affect the leveling operation. Instead, powder is spread evenly around the warped part and the build continues as normal. No impact damage or wear occurs because the electrode and insulator do not touch the powder bed or the warped part. This has been shown in tests to improve PBF process reliability. Unlike with vibration leveling systems, the invention is not affected by the mass of the powder bed and does not adversely affect the laser, laser optics or system sensors. The invention described here provides an excellent solution for non-contact or low-contact re-coating in powder-based 3-D printing.

In addition to avoiding the damage caused by build warping, in testing prototypes of various embodiments carrying out the invention, it was discovered that a distinct type of compaction of the powder bed occurs as a result of the applied alternating current induced electric field. In this regard, the prior art teaches compacting an entire powder bed via the use of a direct current field, a magnetic field or both. In the case of the instant inventive systems and methods, the applied alternating current electric field, does compact the entire bed—but it does so layer-by-layer. Compaction of the target area undergoing processing is beneficial as generally the more dense the build, the stronger it is. Moreover, with the prior art direct current method, that method does not work well for conductive powder because it is not polarizable. Also, it appears from testing that with the prior art direct current method, stronger electric fields are required to achieve the same level of compaction as seen with the present inventions. Finally, the prior art direct compaction techniques do not planarize the powder bed, but instead "squeeze" powder together. In contrast to the prior art, with the present invention system, only the top, working layers of the powder bed are selectively densified and show compaction.

BRIEF DESCRIPTION OF THE DRAWINGS

FIG. 4 depicts the structures and dynamics of a first preferred embodiment recoater of the present invention.

FIGS. 9A-9B depict how a recoater employing only a brush that makes contact with the powder bed during leveling can leave undesirable surface streaks on a powder bed.

FIGS. 10A-10E depict variant embodiment inventive powder recoater systems employing a high voltage alternating current signal applied between the electrode and the powder bed and utilized whereby a variety of techniques are used to rectify non-level powder at the edges of the electrode.

DETAILED DESCRIPTION

Figure 1:
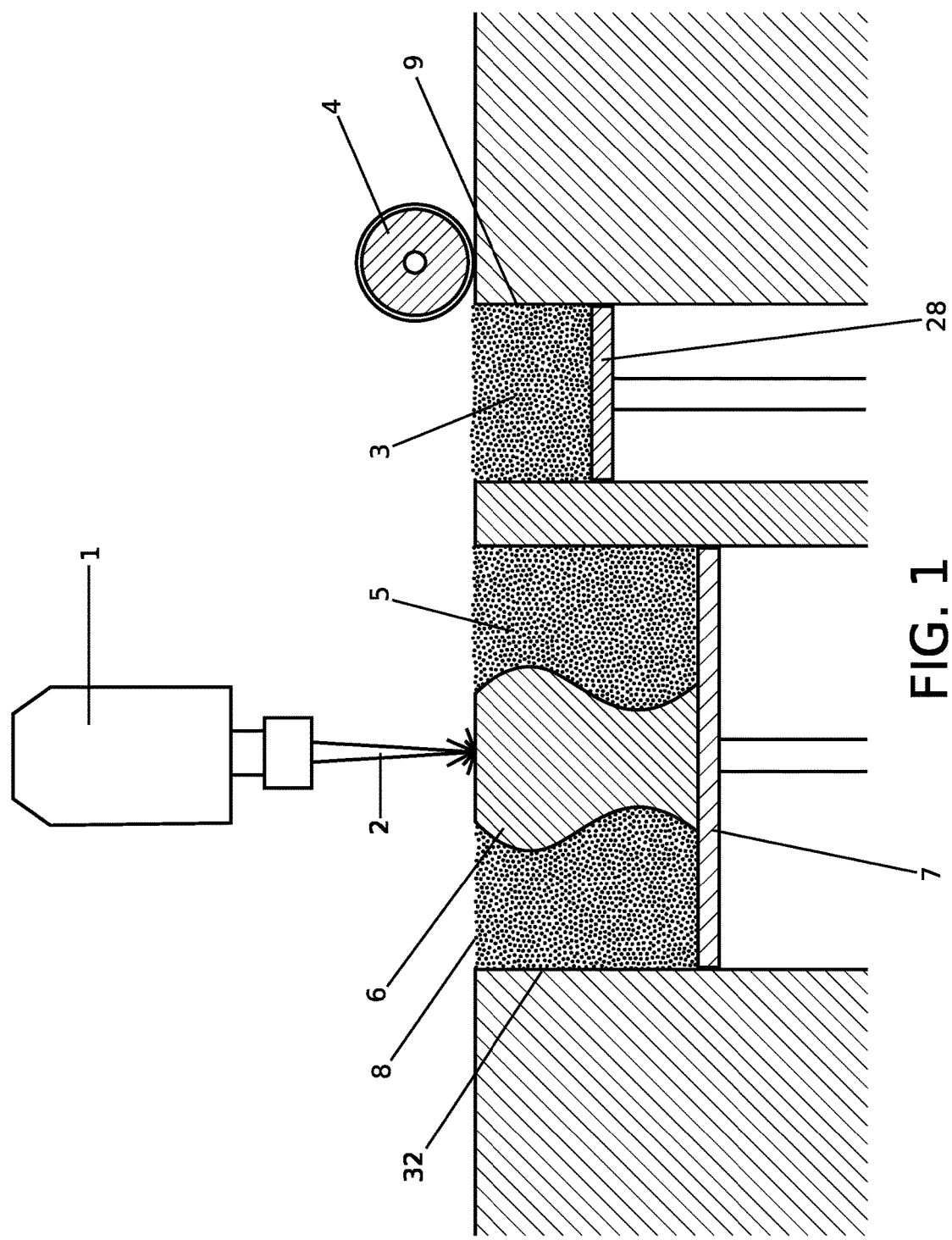
FIG. 1 is a simplified representation of a prior art system for building a part by way of powder bed fusion using heat energy. The system employs a powder roller to level the powder bed.
Figure 2:
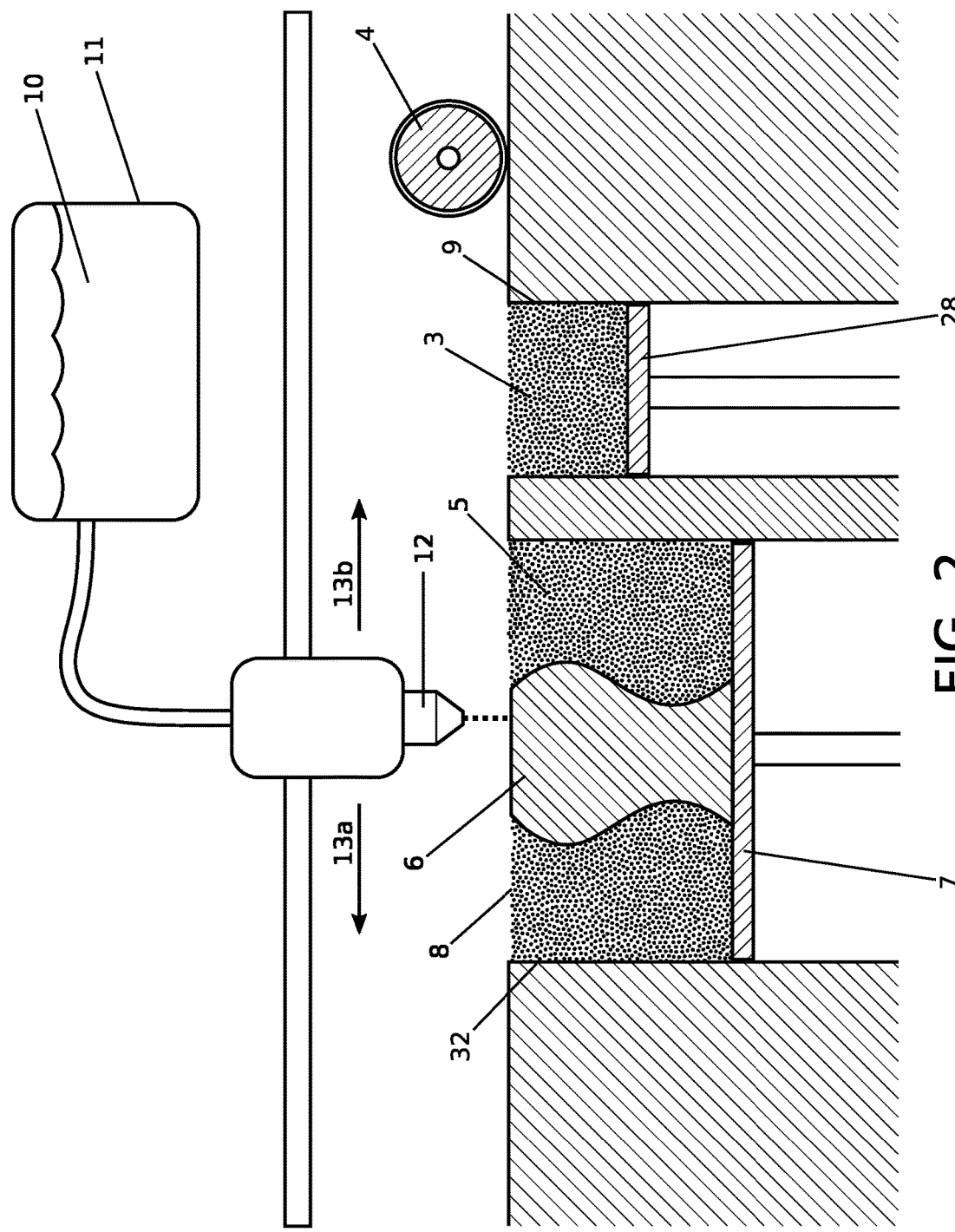
FIG. 2 is a simplified representation of a prior art PBF system for building a part by way of binder jetting. The system employs a powder roller to level the powder bed.
Figure 3A:
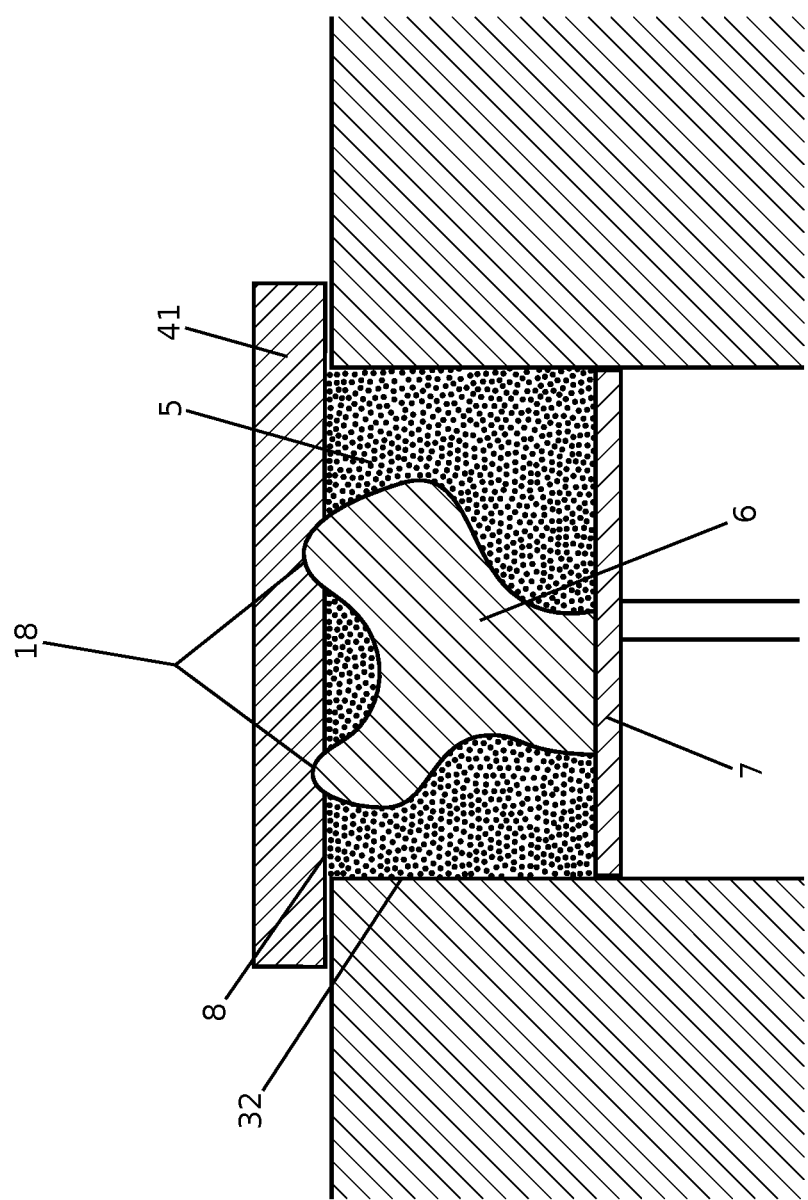
FIG. 3A is a depiction of how a warped part with elements situated proud of the top surface of the powder bed can interfere with the travel path of a scraper, resulting in damage to the scraper.
Figure 3B:
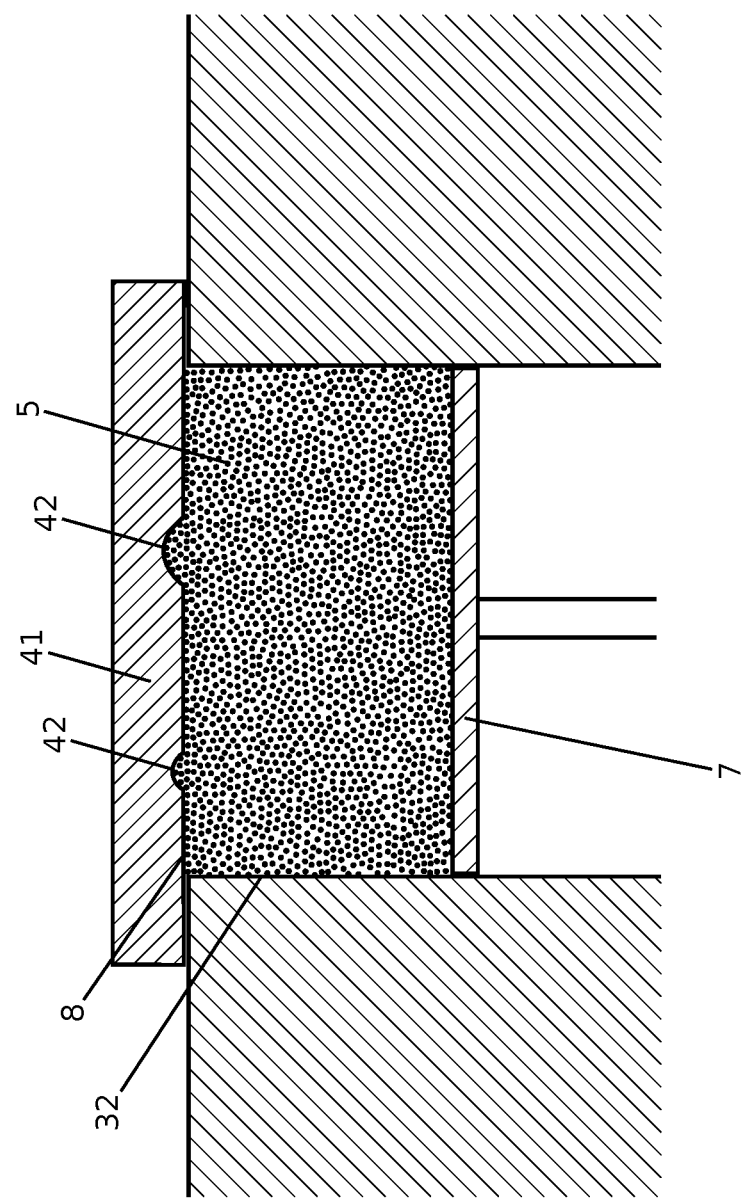
FIG. 3B is a depiction of how a scraper can be damaged through contact with a warped part and be left with scraper defects that result in bumps or streaks in the powder bed.
Figure 3C:
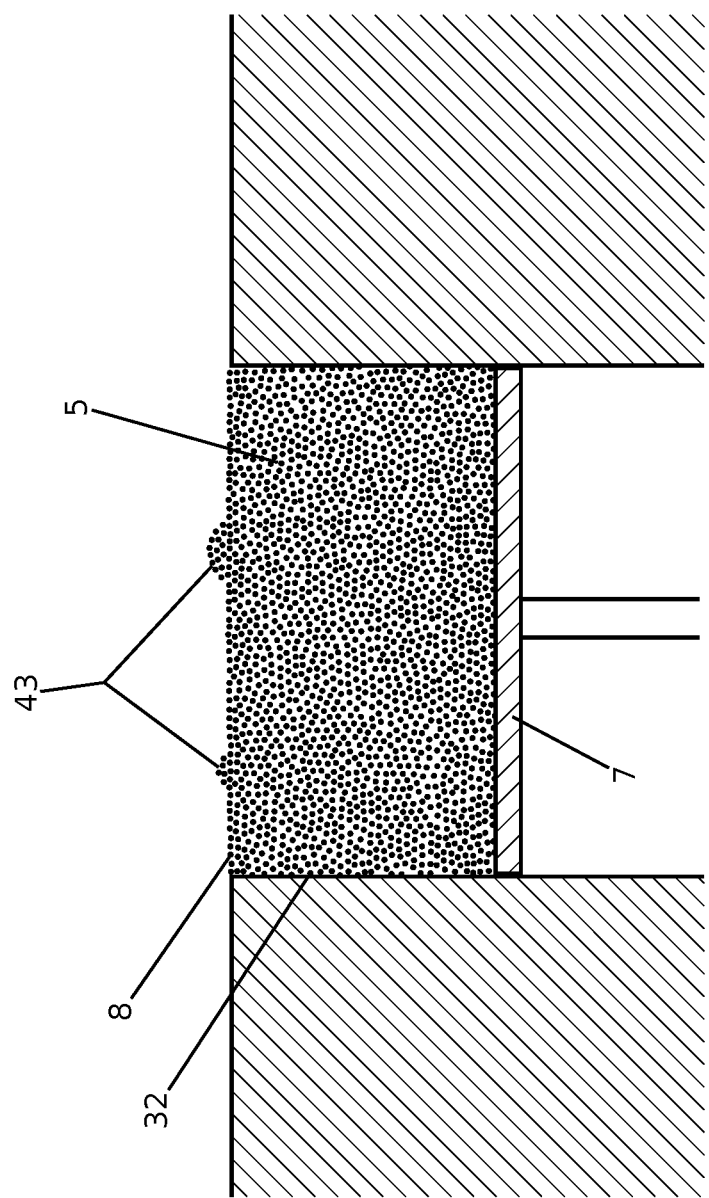
FIG. 3C depicts a powder bed with resulting bumps or streaks caused by defects in the recoating scraper.

FIGS. 4-8D and 10A-10E depict preferred embodiments of the present invention that includes both systems and methods. In practical use, an apparatus or system carrying out a PBF procedure such as depicted in FIGS. 1 and 2 will normally be situated upon a work surface or floor considered horizontal in reference to the user utilizing the apparatus or system. Thus, the directional terms "vertical" and "horizontal" and the like are used to describe a 3-D object building system or apparatus, or the recoater component thereof, with respect to the orientation illustrated in FIGS. 1-2 and also FIGS. 3-10E and are employed merely for the purposes of clarity and illustration. For example, in the orientation shown in FIG. 1, heat source 1 is "vertically" positioned "above" powder bed 5 and powder reservoir 9 is "horizontally" to the "right" of powder bed 5. In FIG. 2 inkjet printhead 12 is "vertically above" powder bed 5 and powder reservoir 9 is "horizontally" to the "right" of powder bed 5. In FIG. 2 arrows 13a, 13b represent "horizontal" traveling movement of inkjet printhead 12 during the binder jetting process.

In addition, the terms "vertical" and "vertically" mean a direction substantially normal to or away from a surface such as build platform 7 on which an object 6 is created. The terms "horizontal" and "horizontally" mean a direction substantially parallel to that of work surface 40 of build platform 7 on which powder bed 5 lies. The terms "substantially perpendicular" and "substantially parallel" mean with respect to a described orientation, structure or force, the stated orientation, structure or force is sufficiently perpendicular or parallel such that performance of the described orientation, structure or force, from the perspective of one with ordinary skill in the art, is the same as though the orientation, structure or force is precisely perpendicular or parallel.

Figure 5:
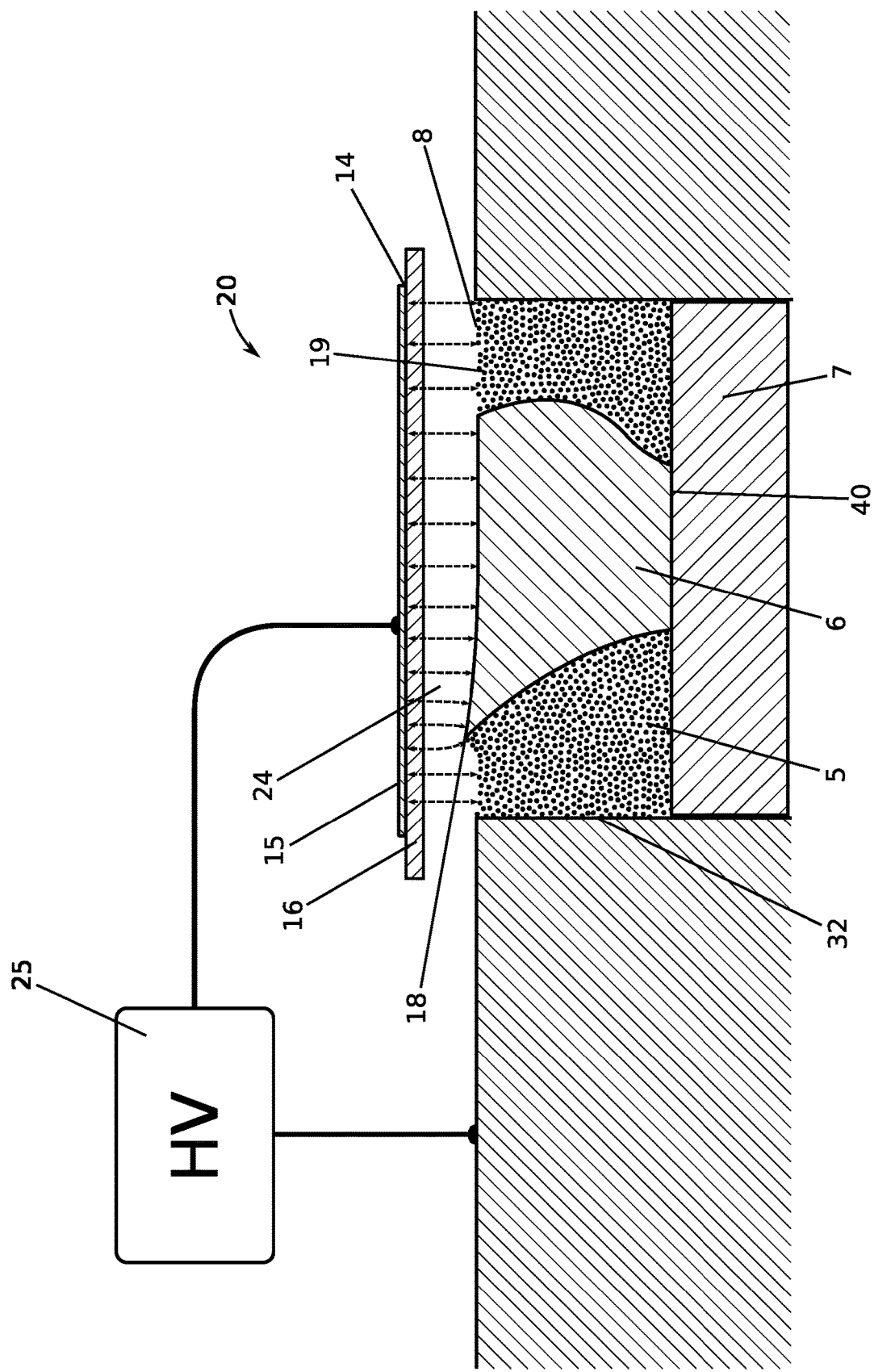
FIG. 5 depicts the structures and dynamics of a first preferred embodiment recoater of the present invention in the situation where the build contains a warped part projecting above the surface of the powder bed.

Referring now to FIGS. 4 and 5 the components of a preferred embodiment non-contact recoater system 20 are now discussed. As shown in these figures, system 20 includes electrode assembly 14. Electrode assembly 14 includes electrode 15 and insulator 16. Recoater system 20 will normally be employed as part of a PBF system. Recoater system 20 includes powder bed 5 holding powder to be fused into an object 6 as part a 3-D manufacturing system. In FIGS. 4 and 5, electrode assembly 14 is in a relative vertical position above build platform 7.

A first preferred embodiment recoater system 20 of the present invention will now be explained with reference to the figures. As shown in FIGS. 4 and 5, in one aspect the present invention is directed to a system 20 for recoating a powder bed. The system has particular beneficial applications for PBF and binder jetting processes and systems. The system includes a build platform 7 with a top work surface 40 that holds a powder bed 5 comprising a top layer 8 made up of dispensed powder bed particles 19. The system includes a voltage supply 25 producing a high voltage alternating current signal. Voltage supply 25 is in electrical communication with powder bed 5 and electrode 15 of electrode assembly 14. Electrode assembly 14 includes a non-conductive dielectric shield (insulator) 16. Electrode assembly 14 is positionable over powder bed 5. When electrode assembly 14 is positioned over powder bed 5, non-conductive dielectric shield 16 is located between electrode 15 and top surface 8 of powder bed 5.

When voltage supply 25 produces a high voltage alternating current signal it results in the creation of an alternating polarity electric field between electrode 15 and powder bed 5. That alternating electric field causes at least some of the individual powder particles 19 of top layer 8 of powder bed 5 to oscillate in region 24 between insulating dielectric shield 16 and powder bed 5. The oscillating powder particles reposition themselves on powder bed 5 such that top layer 8 of powder bed 5 is smoother than it was prior to when the powder particles began oscillating.

In a more specific description, the physical arrangement between electrode assembly 14 and powder bed 5 and the applied alternating current induced electric field created between them generates an alternating electric field strong enough to cause newly dispensed powder particles 19 to rise toward electrode 15 shielded by insulator 16. As the voltage on the electrode alternates, particles rise and fall between powder bed 5 and insulator 16. Particles in region 24 collide with each other and with insulator 16 as they oscillate. The collisions cause particles to tend to move from regions of high powder concentration to lower powder concentration. As a result of this, powder tends to move from areas where powder bed 5 is higher to areas where powder bed 5 is lower, thus leveling the bed.

Electrode 15 is preferably about 2 mm above top surface 8 of powder bed 5. The high-voltage alternating-current signal has a voltage amplitude of preferably between 300V and 5000V generating an electric field strength in region 24 of between 150 to 2500 volts per millimeter. Insulator (dielectric plate) 16 is placed between the electrode and powder bed and prevents direct arcing between powder bed 5 and electrode 15. Note also in the inventive system and methods described herein, the powder bed itself forms a lower electrode for generating the alternating electric field. The powder bed, being at least somewhat electrically conductive, is contained by reservoir 32 which is preferably electrically conductive as well. High voltage supply 25 is in electrical communication with both reservoir 32 and electrode 15 of electrode assembly 14. Powder particles 19, being in contact with each other, allow electrical current to flow from reservoir wall 32 through powder bed 5 to top surface 8 of powder bed 5. This allows the top surface 8 of powder bed 5 to form a lower electrode opposite upper electrode 15. Thus, in the present invention, the powder should be at least somewhat conductive for this method to work. The invention has been successfully tested on powders made from aluminum alloys, steel and stainless-steel compositions, silver and silver alloys, titanium and titanium alloys, elemental iron, tungsten and brass. The method can also be used for polymer and ceramic powders that have at least some conductive or static dissipative properties. It would also be possible to apply a small amount of conductive material to non-conductive powders in order to give the non-conductive powder enough surface conductivity for this method to work.

FIG. 5 depicts the embodiment system 20 in the situation where the build 6 has an upwardly warped projection 18 sitting proud of the top surface 8 of powder bed 5. With the inventive system and methods, if a part warps above the powder bed level, the surrounding powder is leveled nearly the same as if the solid obstruction were not present. The invention described here provides an excellent non-contact solution for powder-based 3D printing. Any part warping above the powder bed level does not affect the leveling operation. Instead and as shown in FIG. 5, powder is spread evenly around the warped part and the build continues as normal. No damage or wear can occur because the electrode and insulator do not touch the powder bed or the warped part. This has been shown in tests to improve PBF process reliability.

FIGS. 6A through 6D demonstrate an embodiment system 20a and method of the invention in which the electrode assembly is part of a carriage structure 21a that moves horizontally over the powder bed. The system includes carriage 21a, which carries electrode assembly 14. Carriage 21a can carry only the electrode assembly or can also carry hopper 22 and dispenser 23. Hopper 22 holds an amount of new powder stock 3. Electrode assembly 14 includes electrode 15 and insulator 16. By virtue of hopper 22 being mounted upon carriage 21a along with electrode 14 and insulator 16, hopper 22, insulator 16 and electrode 15 move in unison and one component, carriage 21a, can carry out powder dispensing and leveling actions.

Figure 6A:
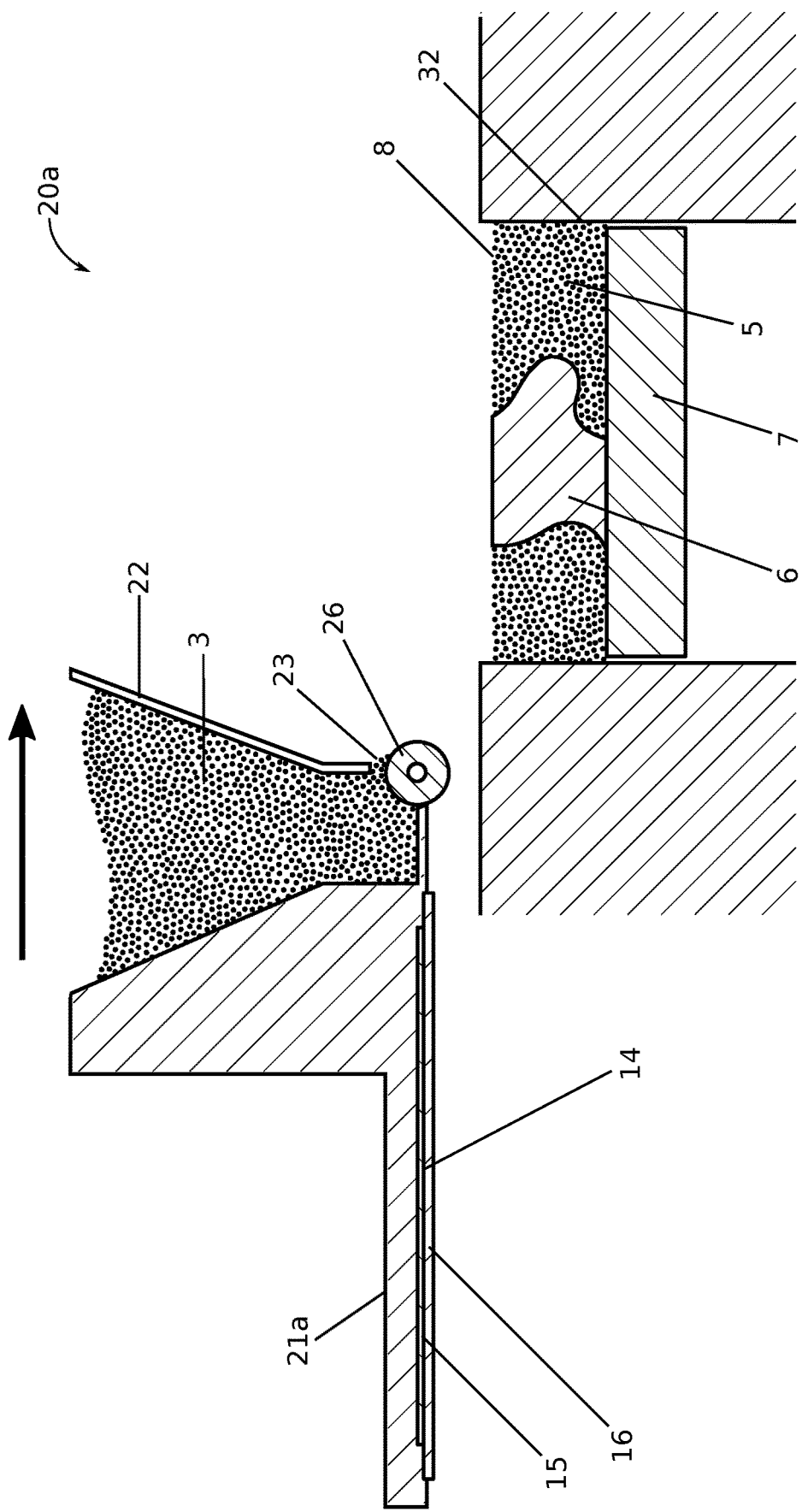
FIGS. 6A-6D depict a present invention, embodiment powder recoater system employing a high voltage alternating current signal applied between the electrode and the powder bed and utilized in a method whereby the recoater electrode remains stationary while planarizing the powder bed in a PBF process.
Figure 6B:
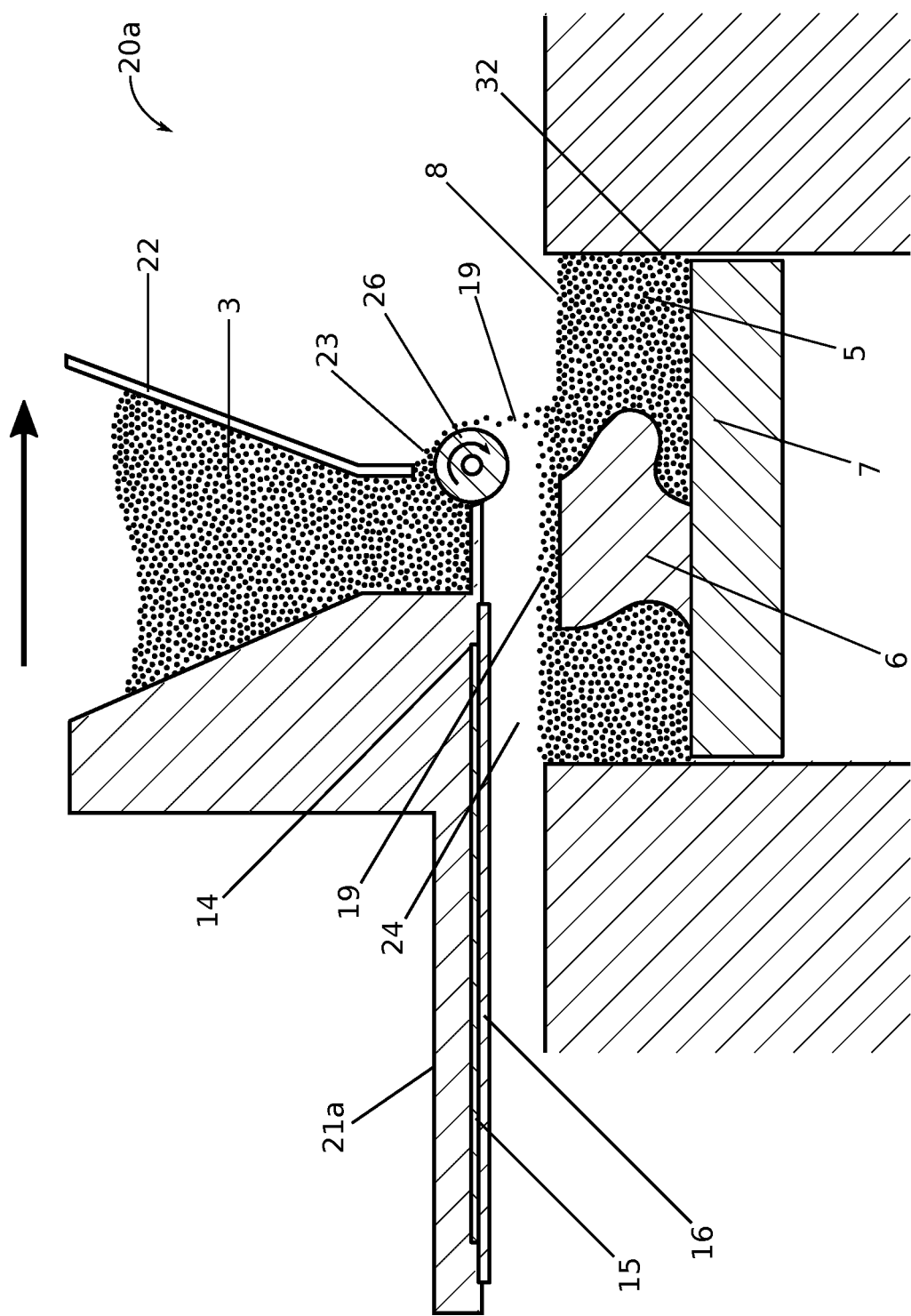
Figure 6C:
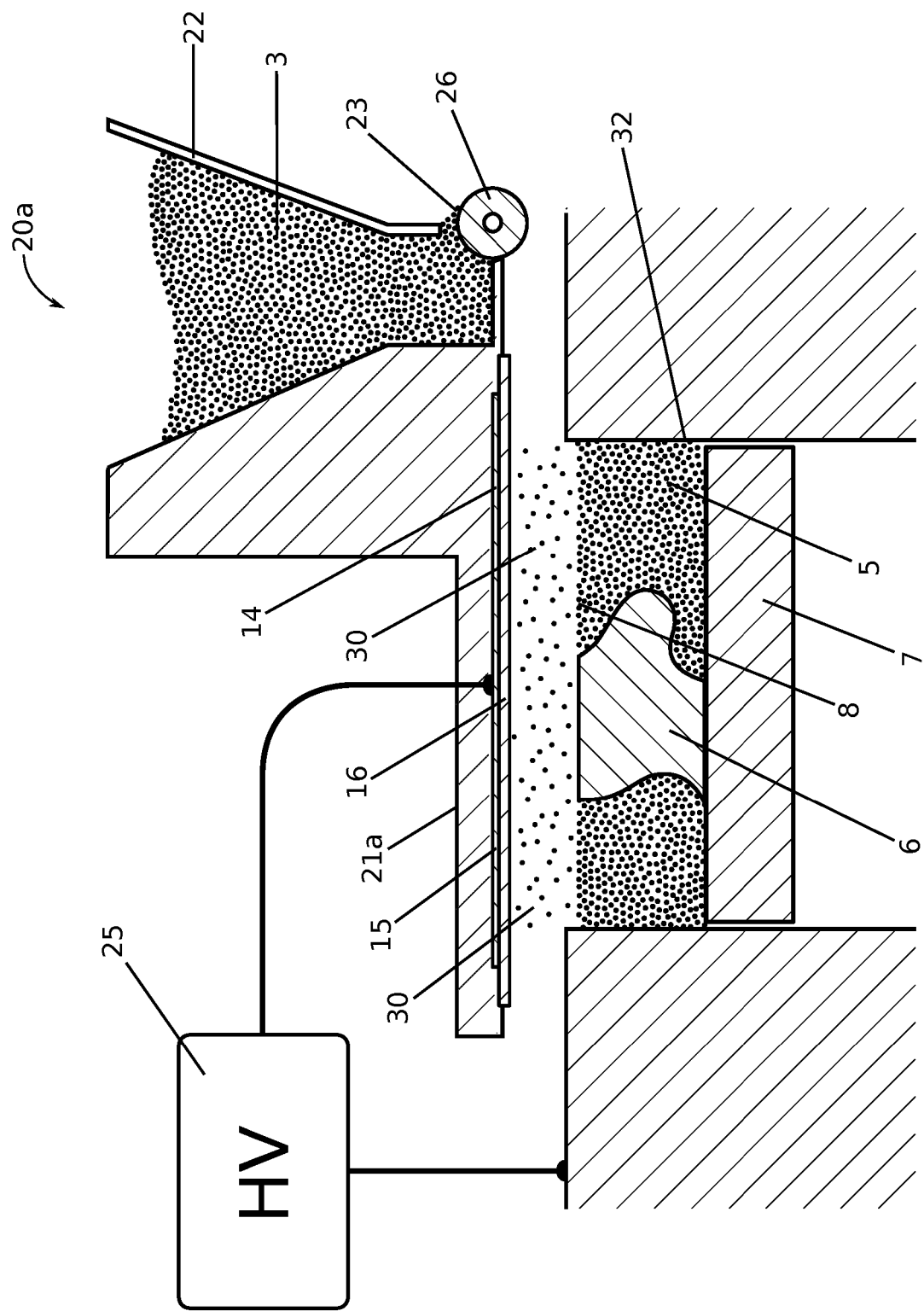
Figure 6D:
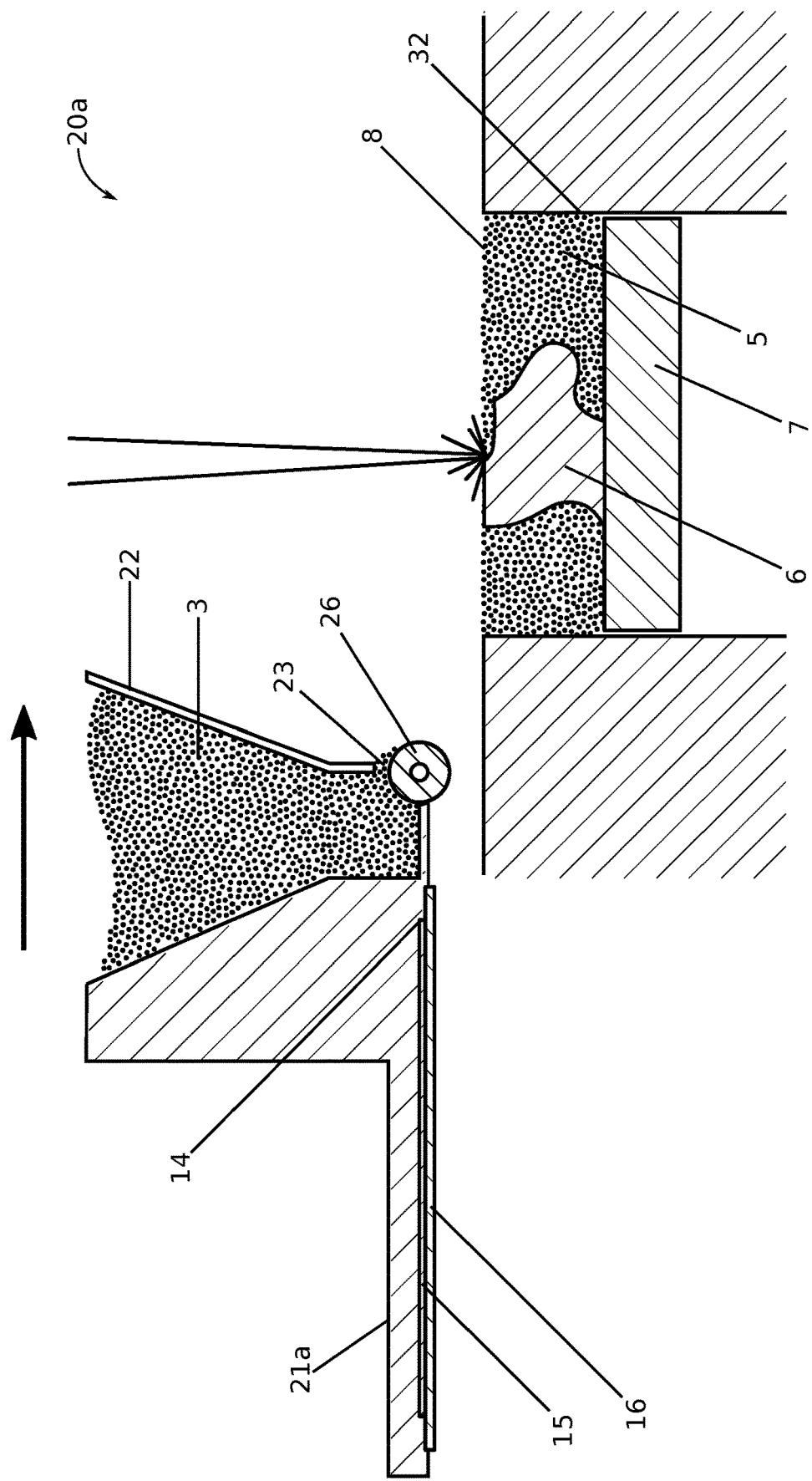

In operation, an embodiment system 20a shown in FIGS. 6A-6D operates thusly. Build platform 7 is vertically positioned (typically by descending) for purposes of creating the next 3-D layer, whether by heat fusion or binder jetting. This is shown in FIG. 6A. FIG. 6B shows that after build platform 7 is moved into position to create the next layer of the build, carriage 21a moves over powder bed 5 and dispenses powder 3 from dispenser 23, which receive new powder stock 3 from hopper 22. Dispenser 23 is exemplarily shown to dispense powder via drum 26, which rotates along a horizontal axis. The direction of travel of the carriage during its powder dispensing phase is shown by the arrow in each of FIGS. 6A and 6B. Powder bed 5 now includes loose powder 19 and part 6. Powder bed has a top surface 8. FIG. 6C shows that after dispenser 23 of carriage 21a passes over the powder bed 5, carriage 21a stops. Once carriage 21a stops, a voltage generator 25 in communication in electrode 14 creates an alternating current electric field between electrode 15 and powder bed 5. As shown in FIG. 6C powder particles that were at the top surface 8 of powder bed 5 below electrode 14 (shielded by insulator 15) oscillate in space 24. The oscillating powder particles are denominated by numeral 30. The alternating electric field induced oscillation results in top surface 8 of powder bed 5 leveling. FIG. 6D shows that after top surface 8 is leveled, carriage 21a moves away from the powder bed and heat energy or binder is delivered to the target area of the powder bed, resulting in the fusing of a new layer on build 6.

FIGS. 7A-7D demonstrate an embodiment system 20b and method similar to those described with respect to FIGS. 6A-6D. However, in FIGS. 7A-7D, electrode assembly 14 is part of a carriage structure 21b that applies an electric field as it moves horizontally over powder bed 5. As with the system and method described in FIGS. 6A-6D, carriage 21b can carry only electrode assembly 14, but preferably also carries hopper 22 (holding an amount of new powder stock 3) and dispenser 23. Electrode assembly 14 includes electrode 15 and insulator 16. By virtue of hopper 22 being mounted upon carriage 21b along with electrode 14 and insulator 16, hopper 22, insulator 16 and electrode 15 move in unison and one component, carriage 21b, can carry powder dispensing and leveling actions.

Figure 7A:
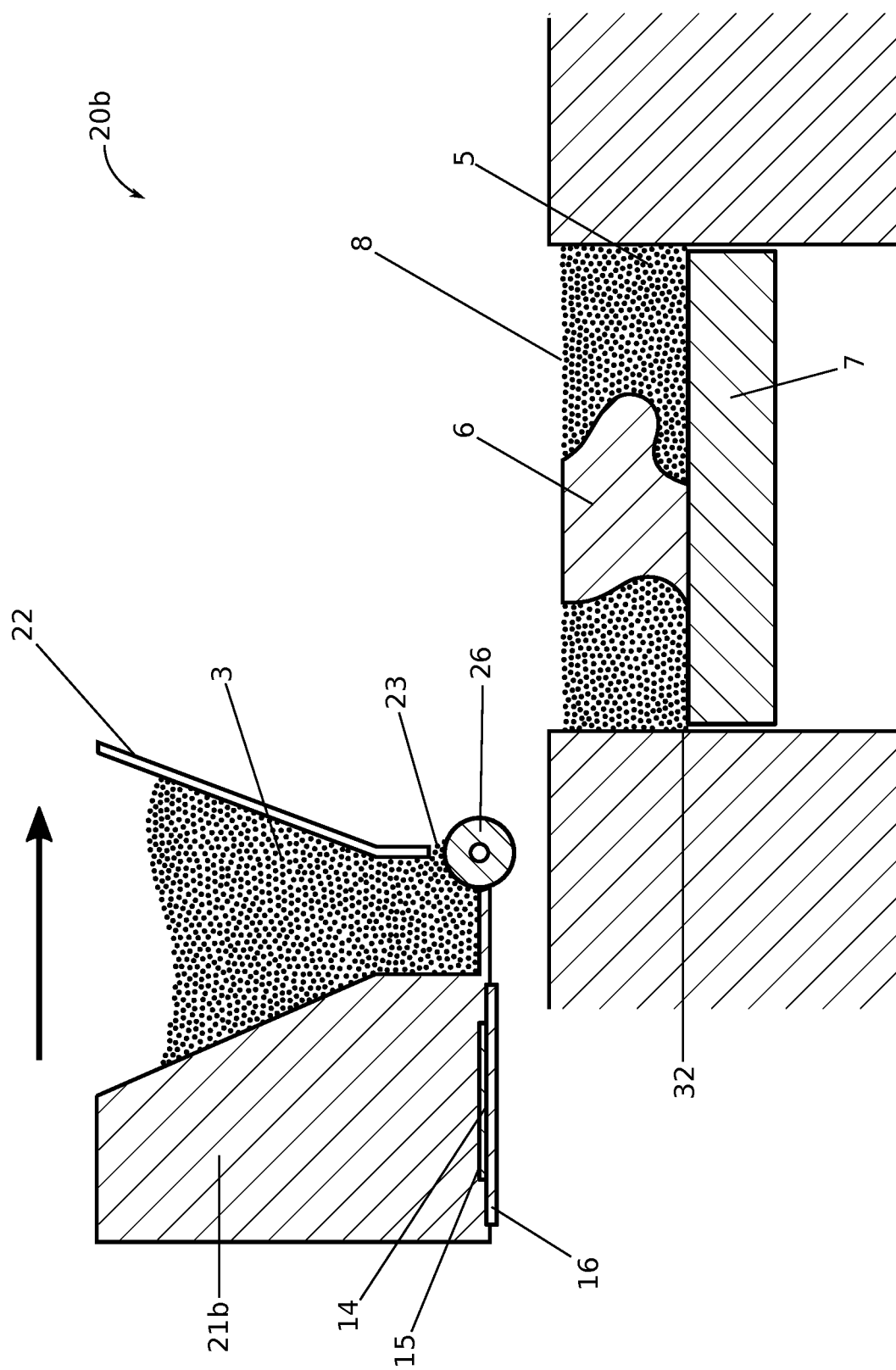
FIGS. 7A-7D depict a present invention, embodiment powder recoater system employing a high voltage alternating current signal applied between the electrode and the powder bed and utilized in a method whereby the recoater electrode is in motion while planarizing the powder bed in a PBF process.
Figure 7B:
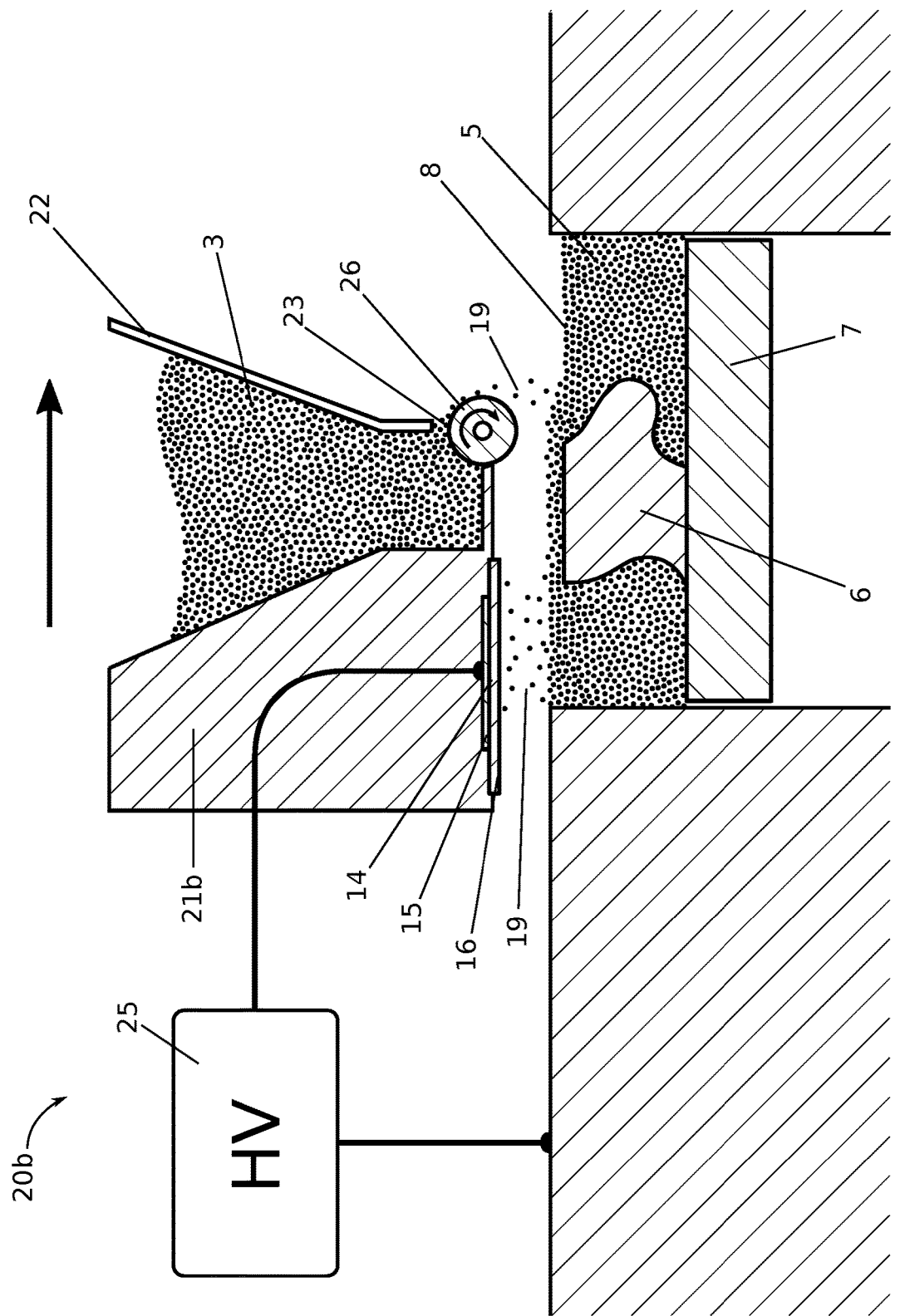

In operation the system 20b shown in FIGS. 7A-7D operates thusly. As shown in FIG. 7A, build platform 7 is vertically positioned (typically by descending) for purposes of creating the next 3-D layer (whether by heat fusion or binder jetting). After build platform 7 is moved into position to create the next layer of the build, carriage 21b moves over powder bed 5 and dispenses powder 3 from dispenser 23, which receive new powder stock 3 from hopper 22. This step is shown in FIG. 7B. As part of this step, a layer of new powder 19 is dispensed roughly onto powder bed 5 from hopper 22 mounted to moving carriage 21b. Dispenser 23 is exemplarily shown to dispense powder via drum 26, which rotates along a horizontal axis. As drum 26 rotates, it dispenses powder as carriage 21b moves across powder bed 5. After the dispensing step, the newly dispensed powder 19 on powder bed 5 will be roughly flat, but not flat enough for a successful fusion process. Powder bed 5 now includes loose powder 19 on its top surface 8 and part 6.

Figure 7C:
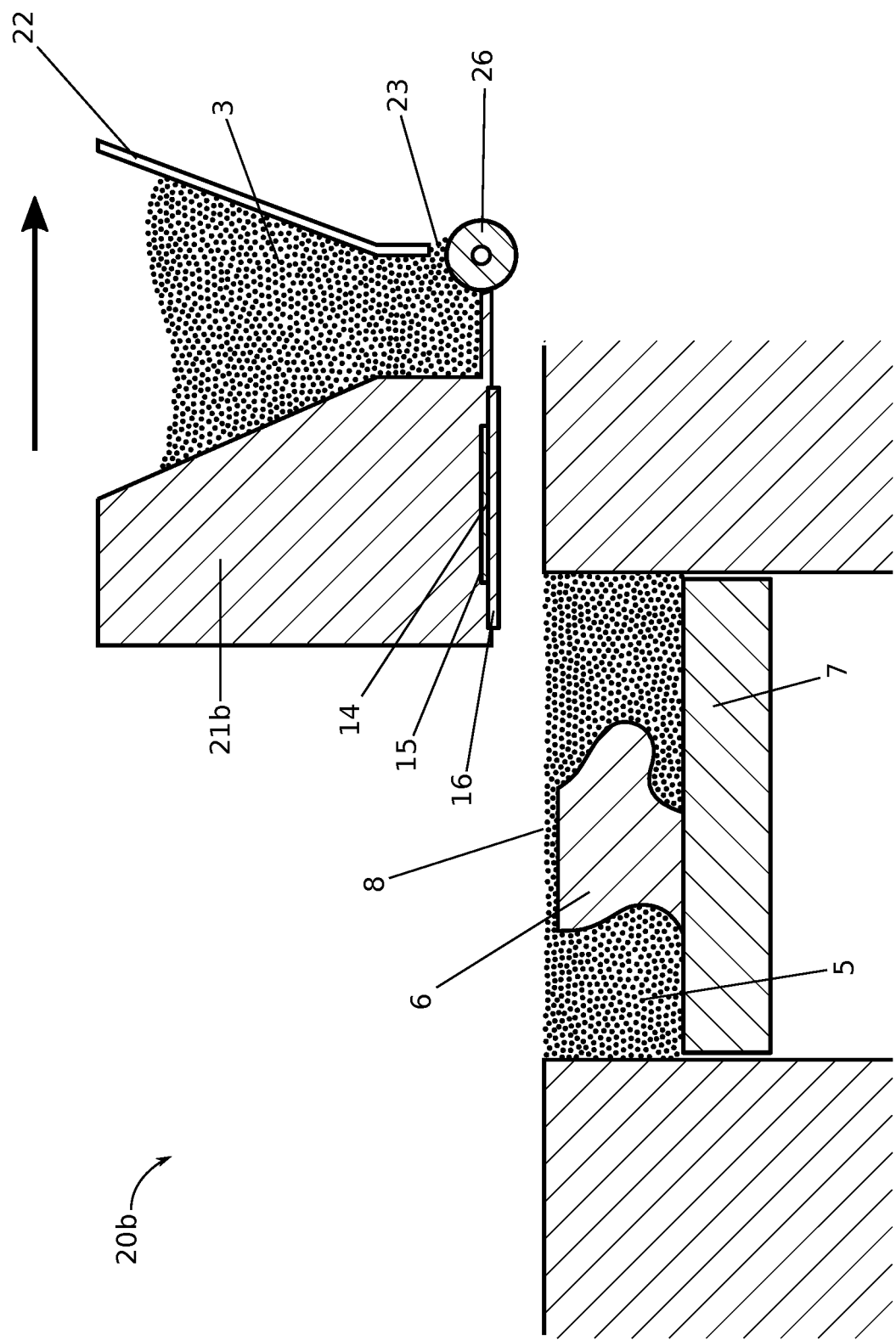
Figure 7D:
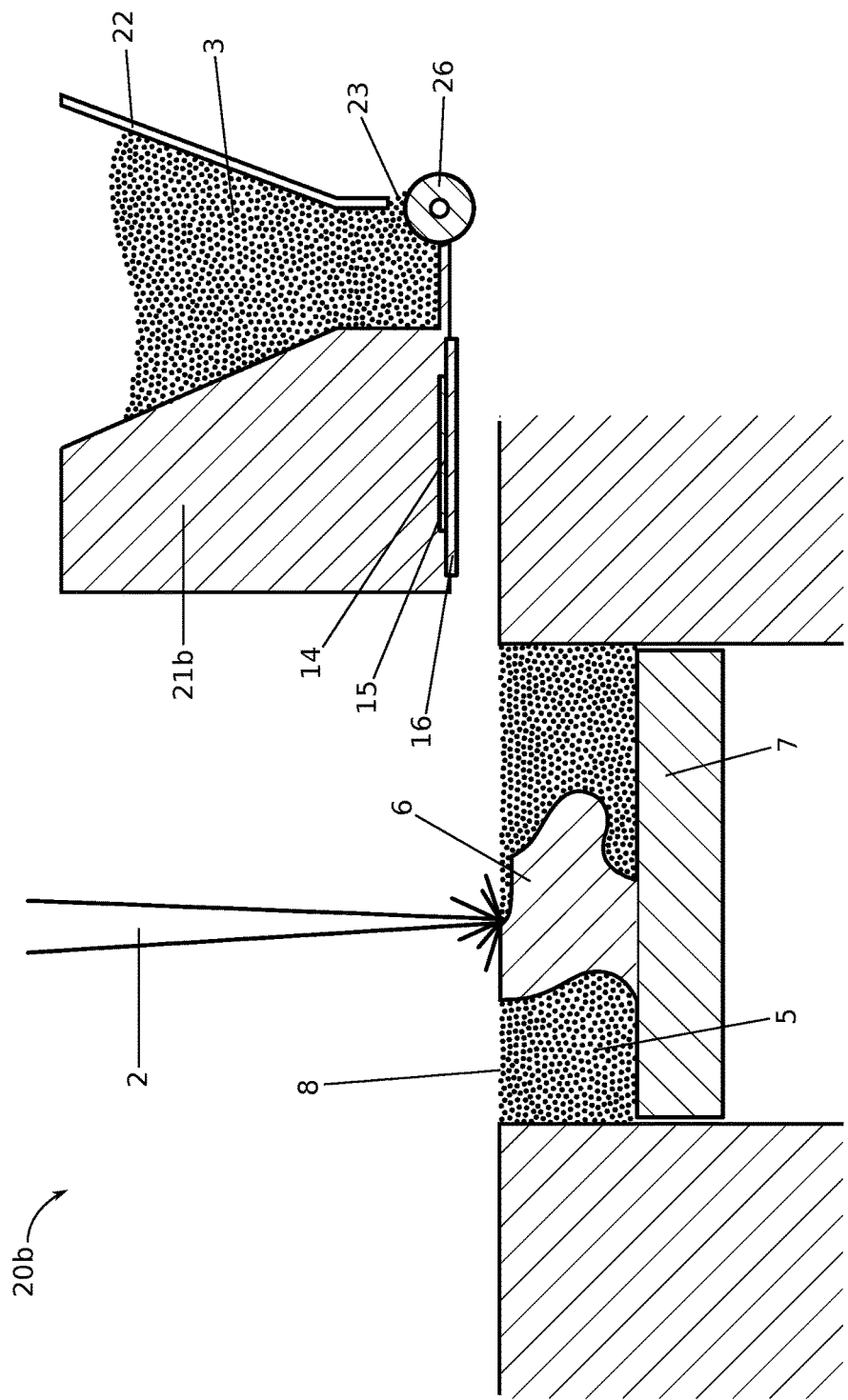

In the system 20a and method shown in and described with reference to FIGS. 6A-6D the electric field is applied after carriage 21a has passed over powder bed 5 to dispense new powder 3 from hopper 22 and come to a stop. In contrast to that system and method, in the system 20b and method of FIGS. 7A-7D electrode 15 is live and applying an alternating electric field as carriage 21b moves over powder bed 5. The direction of travel of the carriage during its powder dispensing phase is shown by the arrow in each of FIGS. 7B and 7C. While dispenser 23 of carriage 21b is passing over powder bed 5 and dispensing powder, a voltage generator 25 in communication with trailing electrode 15 creates an alternating current induced electric field between electrode 15 and powder bed 5. This is shown in FIG. 7B. More specifically, after dispenser 23 on carriage 21b dispenses powder on to an area of powder bed 5, carriage 21b continues moving, carrying trailing electrode 14 over the area of powder bed 5 having just received the newly dispensed powder 19 from dispenser 23. As electrode assembly travels over the area of the powder bed having just received new dispensed powder 19, an alternating electric potential is applied between electrode 15 and powder bed 5, causing powder 19 beneath shielded electrode 15 to begin oscillating in space 24 between insulator 16 and top surface 8. As carriage 21b moves, the oscillating powder particles redistribute themselves due to interparticle collisions and repulsion, flattening powder bed 5. FIG. 7C shows that carriage 21b moves past the target area of powder bed 5 where the build object 6 is located. At this point, the powder particles 19 of top surface 8 of powder bed 5 have been leveled. A heat source 1 delivers heat energy to a target area on powder bed 5 to melt or sinter powder 19 into a newly created build layer. This is shown in FIG. 7D. In the case of binder jetting, after carriage 21b has passed over powder bed 5, inkjet printhead can deliver binder solution on to the build area of the powder bed. With binder jetting, the inkjet printhead could be mounted on carriage 21b along with hopper 22 and electrode assembly 14 so that recoating and binding occurs in one motion of the carriage.

With respect to the system 20b and method of FIGS. 7A-7D, the travel velocity and electrode width of carriage 21b must be chosen so that electrode 15 spends enough time over each point in the powder bed for proper leveling action to occur. Any changes in travel velocity occurring while the carriage is moving over the powder bed can result in discontinuities in the surface of powder bed 5. In order to achieve a consistent leveling action, a constant velocity should be used in dynamic leveling configurations of the invention.

FIGS. 8A-8D demonstrate an embodiment system 20c and method in which the carriage 21c includes a depending brush 27. Tests have shown that combining an electrode assembly as previously described with a brush in a recoater mechanism provides better planarizing as compared to using a scraper or roller. In the preferred embodiment recoater of FIGS. 8A-8D, brush 27 is located at the forward head 29 of carriage 21c relative to its leveling direction of travel represented by the arrows in FIGS. 8A and 8B. In this fashion brush 27 occupies an advance position on carriage 21c (relative to electrode assembly 14) to push powder 19 on top surface 8 as a primary leveling step prior to subjecting the brushed powder to the leveling effects of the electric field created by electrode assembly 14. Note however that electrode assembly 14 and brush 27 need not be mounted on the same carriage. In fact, electrode assembly could be mounted on a another structure or device that effects its position over the powder bed.

Referring back to the embodiment of FIGS. 8A-8D, electrode assembly 14 is positioned on carriage 21c behind brush 27 and as the carriage continues traveling over the just-brushed powder it more precisely flattens powder bed 5. Though carriage 21c is depicted in FIGS. 8A-8D as not including a dispenser or hopper, this is merely for clarity of explanation and simplicity of presentation. Carriage 21c could include a dispenser and hopper as shown in the embodiments of FIGS. 6A-7D.

In the embodiment method depicted in FIGS. 8A-8D, build platform descends in an amount representing the next layer of the 3-D build. In accordance with that adjustment of the build platform, new powder stock 3 is dispensed from reservoir 9 by virtue of elevator platform 28 rising the determined amount based upon the next layer of object 6 to be built. Thus, in the embodiment shown brush 27 moves new powder 3 off the top of reservoir 9 and on to powder bed 5 in the manner of a push broom.

Figure 8A:
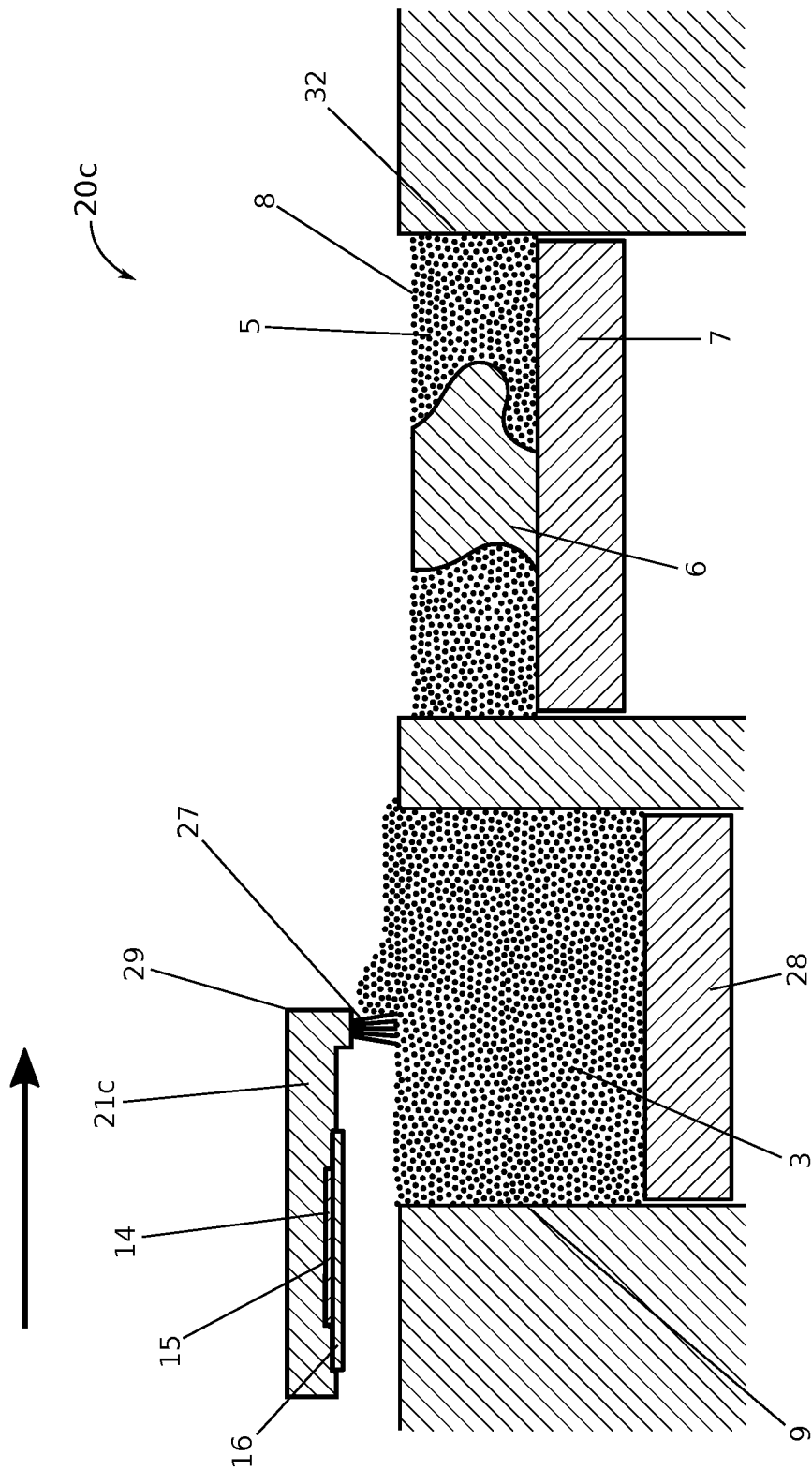
FIGS. 8A-8D depict a present invention, embodiment powder recoater system employing a brush in combination with a high voltage alternating current signal applied between the electrode and the powder bed and utilized in a method whereby the recoater electrode is in motion across the powder bed.

In the system 20c and method of FIGS. 8A-8D electrode 15 is live and applies an alternating current electric field as carriage 21c moves over powder bed 5. The direction of travel of the carriage is shown by the arrow in each of FIGS. 8A and 8B. An embodiment process and system 20c will now be described. FIG. 8A shows a powder measurement and build positioning phase of the process that occurs after a layer of the build is created or when the first layer of the build is created. In this phase build platform 7 descends the predetermined amount for building the next (or first) layer. Simultaneously with, before or after platform 7 descends, powder supply elevator rises a predetermined height for purposes of placing an amount of new powder stock in front of brush 27 for dispensing over powder bed 5. Carriage 21c then begins to move to push new powder 3 on to powder bed 5.

Figure 8B:
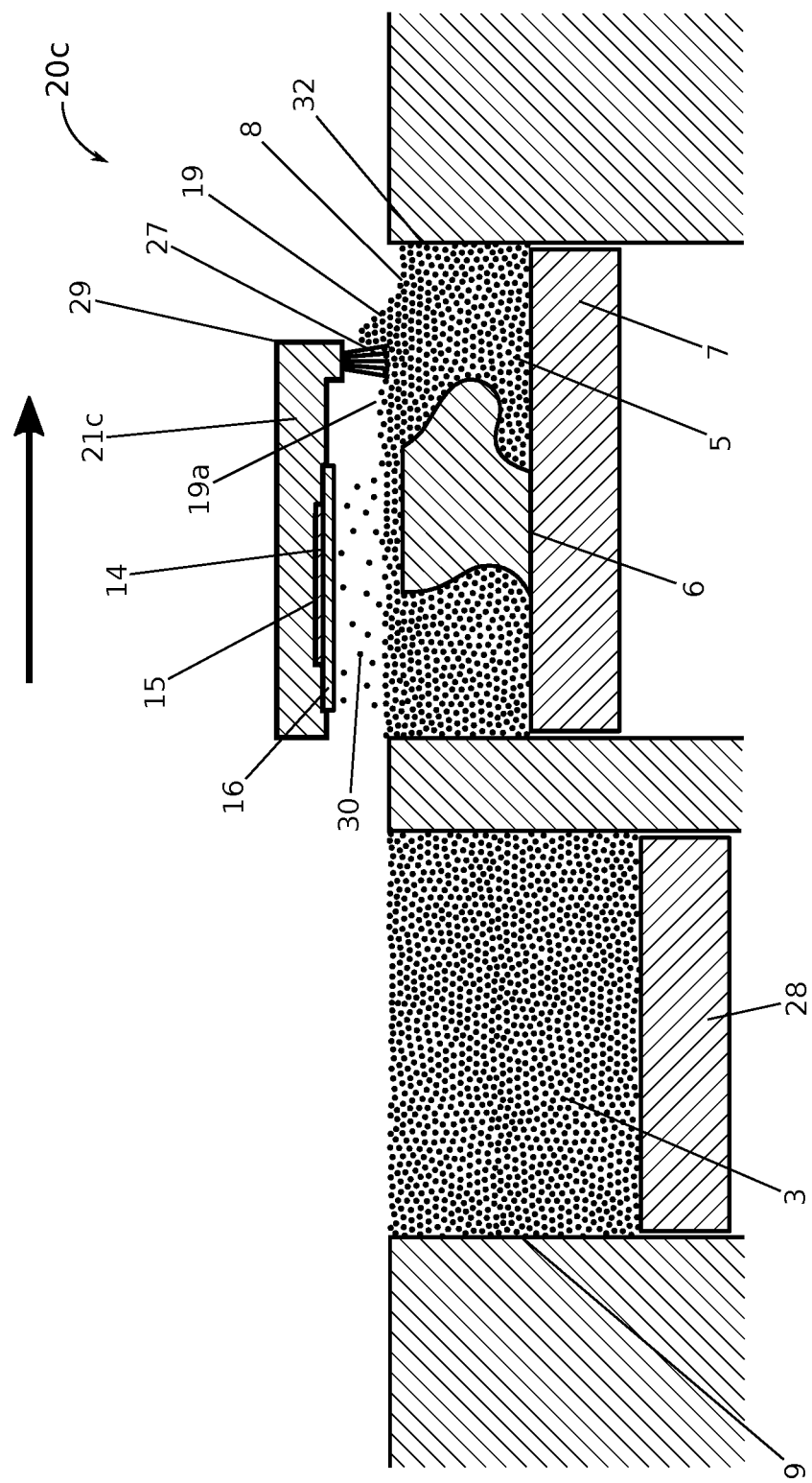
Figure 8C:
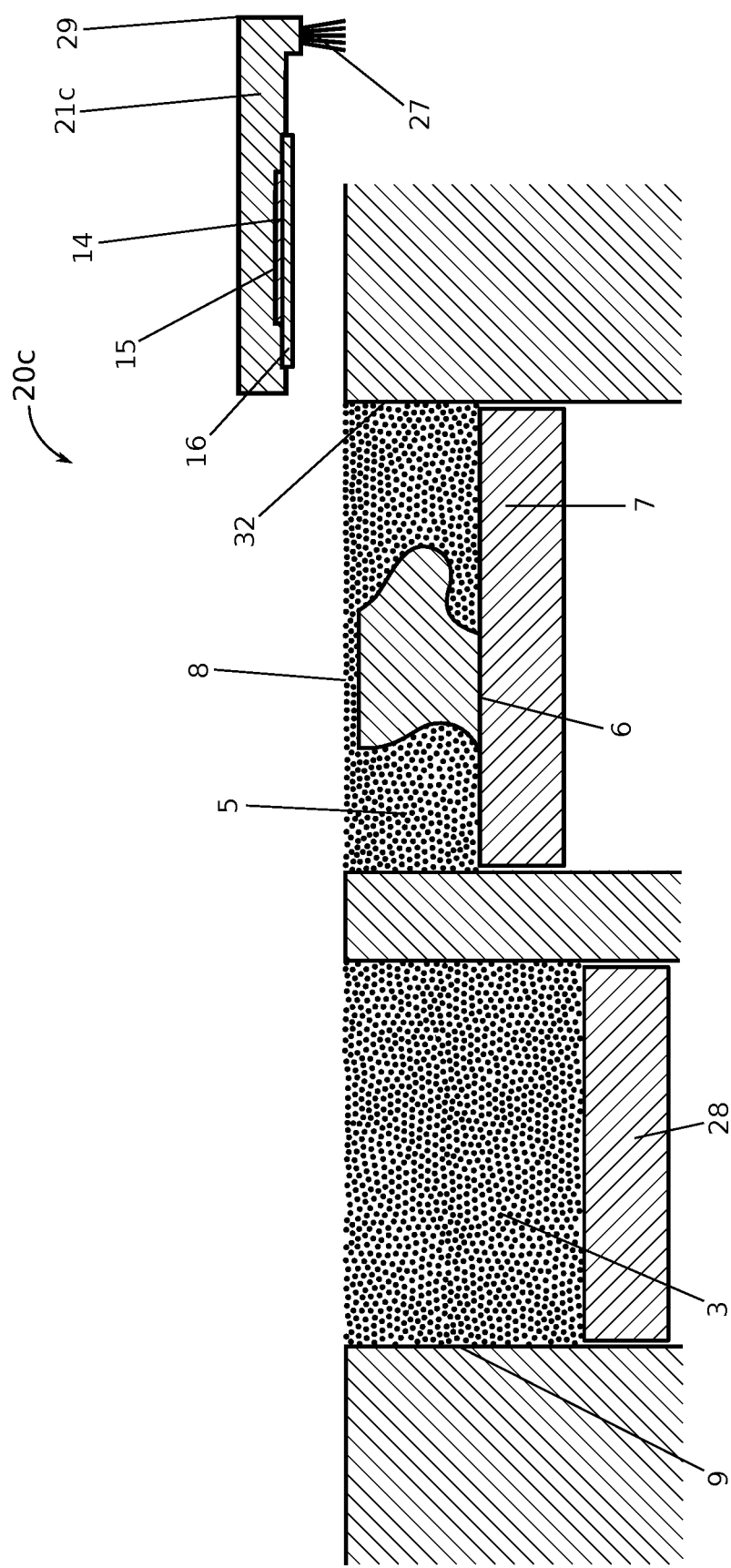
Figure 8D:
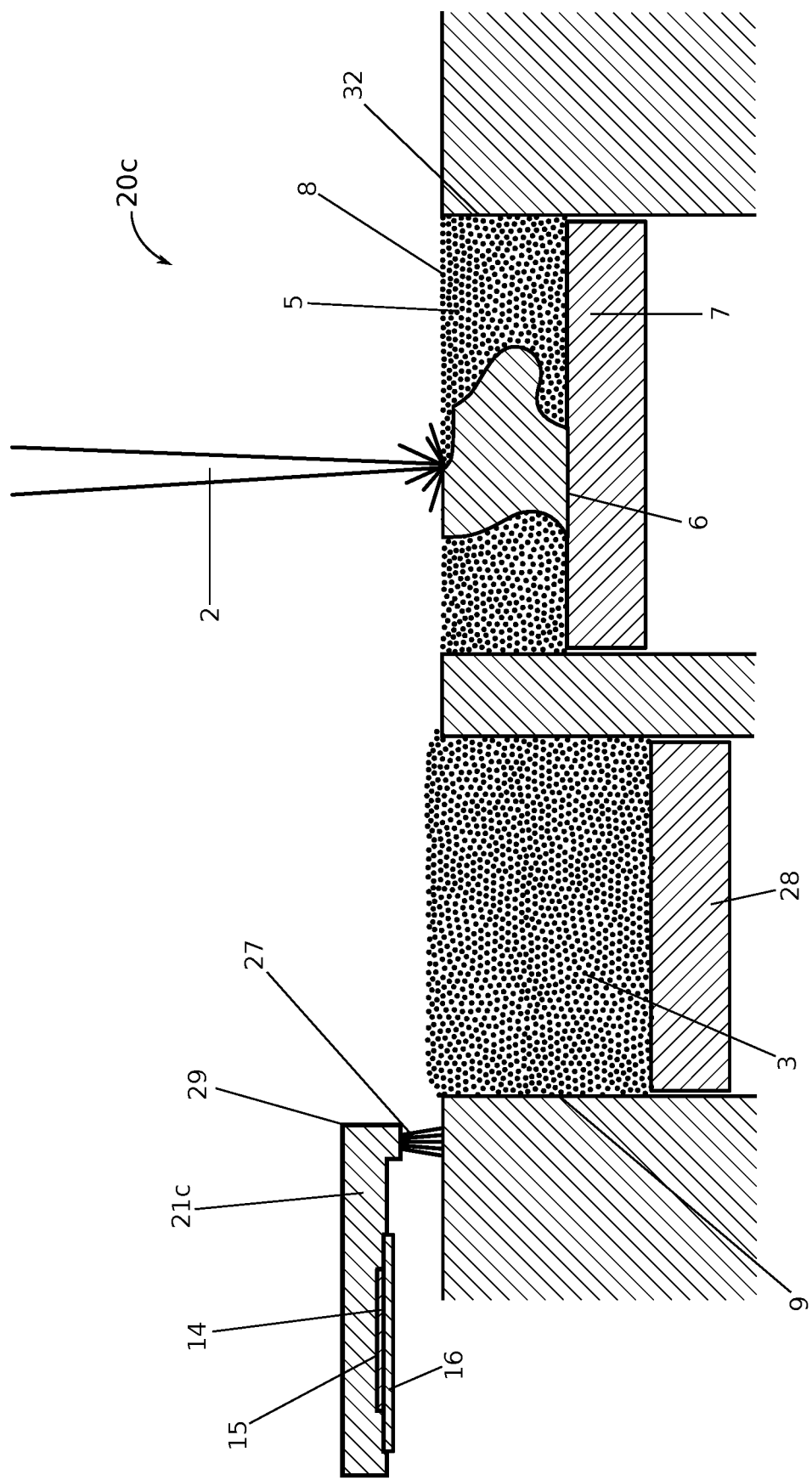

As shown in FIG. 8B, as carriage 21c moves over powder bed 5, new powder 3 is dispensed over powder bed 5 and brushed by brush 27. Brush 27 on carriage 21c lightly brushes across top surface 8 of powder bed 5 effecting a first smoothing and leveling action on top surface 8, leaving just-brushed newly dispensed powder particles 19a behind. As carriage 21c moves, electrode assembly 14 trails behind brush 27 and travels over just-brushed particles 19a. As electrode assembly 14 travels over the just-brushed area of powder bed 5, an alternating electric potential applied between electrode 15 and powder bed 5 causes powder 19a beneath shielded electrode 15 to begin oscillating in space 24 between insulator 16 and top surface 8. As carriage 21c moves, the oscillating powder particles 30 redistribute themselves due to interparticle collisions and repulsion, flattening powder bed 5. In FIG. 8C, the carriage has moved past powder bed 5 or at least the target area of powder bed 5. After carriage 21c has passed over powder bed 5, a heat source 1 delivers heat energy to a target area on powder bed 5 to melt or sinter powder 19 into a newly created build layer (FIG. 8D). In the case of binder jetting, after carriage 21 has passed over powder bed 5, inkjet printhead can deliver binder solution on to the build area of the powder bed. With binder jetting, the inkjet printhead could be mounted on carriage 21 along with hopper 22 and electrode assembly 14 so that recoating and binding occurs in one motion of the carriage. After the new layer is fused, carriage 21c can return to its pre-dispensing position, powder supply elevator 28 moves up the predetermined amount and build platform 7 moves down its predetermined amount.

As with the system and method of FIGS. 7A-7D, with the system and method of FIGS. 8A-8D, the travel velocity and electrode width of carriage 21c must be chosen so that electrode 15 spends enough time over each point in the powder bed for proper leveling action to occur. Any changes in travel velocity occurring while the carriage is moving over the powder bed can result in discontinuities in the surface of powder bed 5. In order to achieve a consistent leveling action, a constant velocity should be used in dynamic leveling configurations of the invention.

Figure 9B:
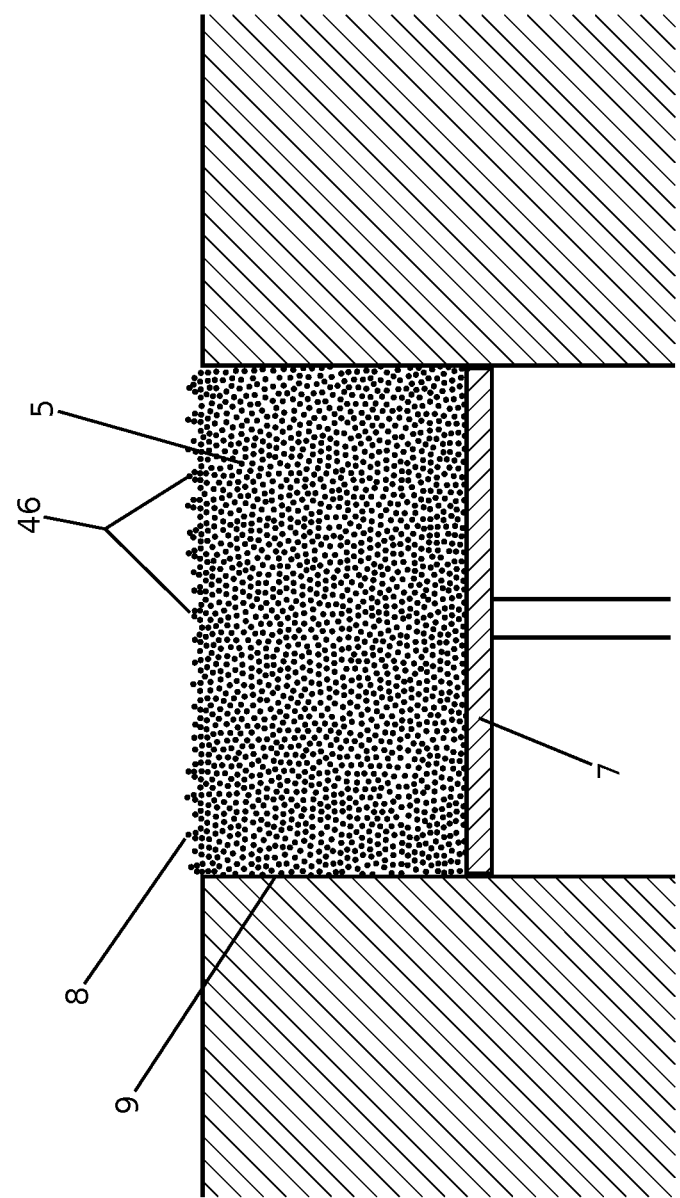

The embodiment system 20c and method of FIGS. 8A-8D greatly improve the recoating process over prior art systems. In one respect and as depicted in FIGS. 9A-9B, a brush alone is insufficient to accurately level a powder bed. This is due to the fact that brushes leave trenches 46 longitudinally oriented in terms of the carriage travel direction in the powder bed surface. However, a brush in combination with a trailing electrode offers improved powder bed leveling for powder-based 3-D formation processes. This gives a brush and electrode combination many of the advantages of a purely non-contact leveling method but is still very simple and inexpensive. The brush embodiment also has the advantage of being backwards-compatible with existing PBF systems. A brush and electrode can be retrofitted on many PBF systems without much effort.

Similarly, a scraper in combination with a trailing electrode offers improved powder bed leveling for powder-based 3-D formation processes. A system 20*d* combining alternating electric field planarizing and a scraper 41 is shown in FIG. 14. This system would operate similarly to the system and method described in reference to the brush and electrode combination shown in FIGS. 8A-8B. A scraper-electrode embodiment also has the advantage of being backwards-compatible with existing PBF systems. A scraper and electrode can be retrofitted on many PBF systems without much effort.

Figure 10A:
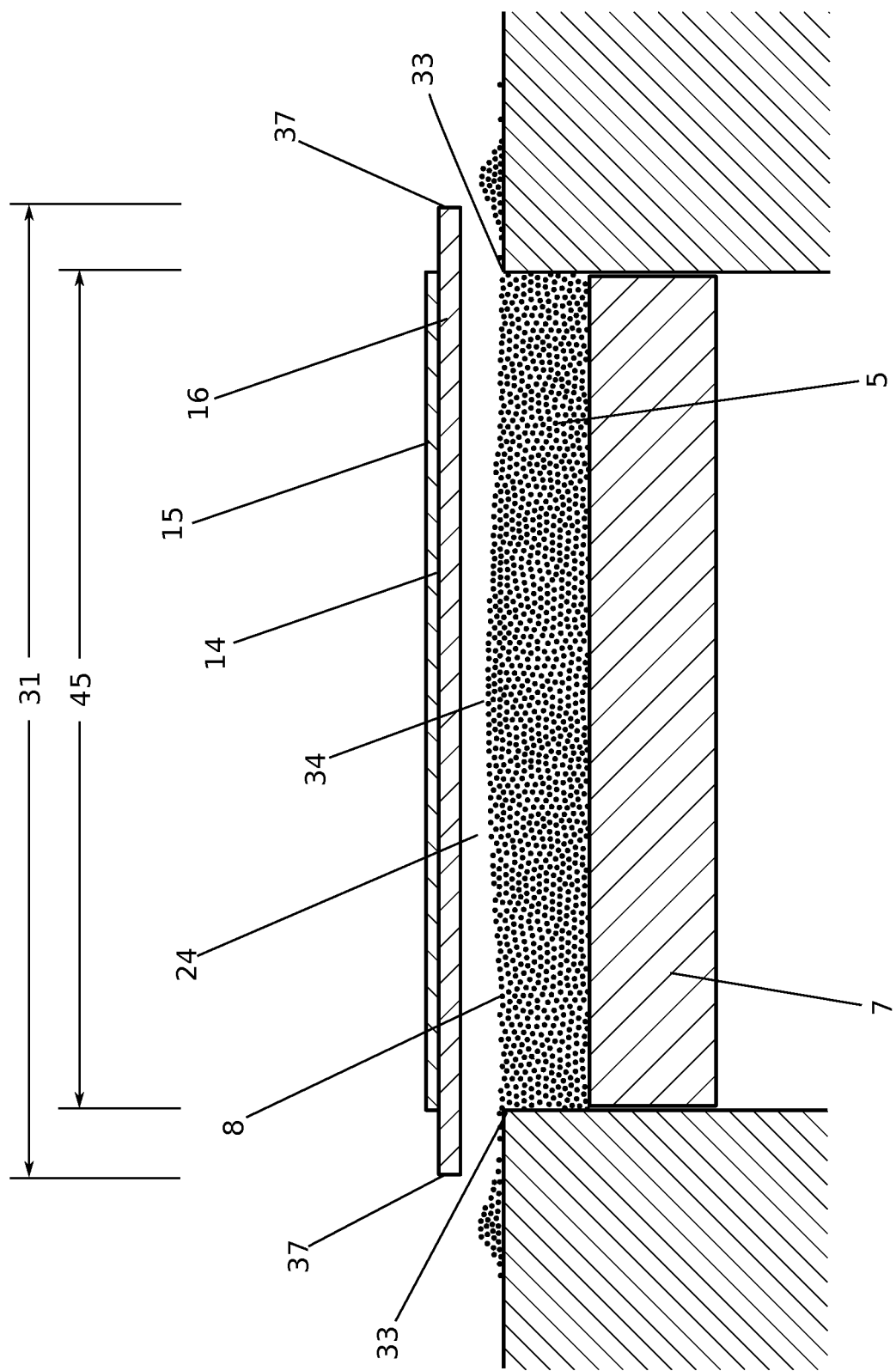

In tests of the embodiment systems and methods, it has been shown that if powder can escape around the edges of electrode assembly 15 it will cause the bed to not be level. This is shown in FIG. 10A As shown in this figure, if powder can escape the edges of the electrode assembly, powder bed 5 bows in the center area under electrode assembly 14 and is lower at the edges of electrode assembly 14. This discrepancy in powder level is not acceptable in additive manufacturing. The powder bed must be level within a few microns or tens of microns. FIGS. 10B-10E depict possible enhancements to the discussed embodiment systems and methods addressed to limiting the ability of powder to escape around the edges of electrode assembly 14. These possible enhancements can be used singularly or additively.

Figure 10B:
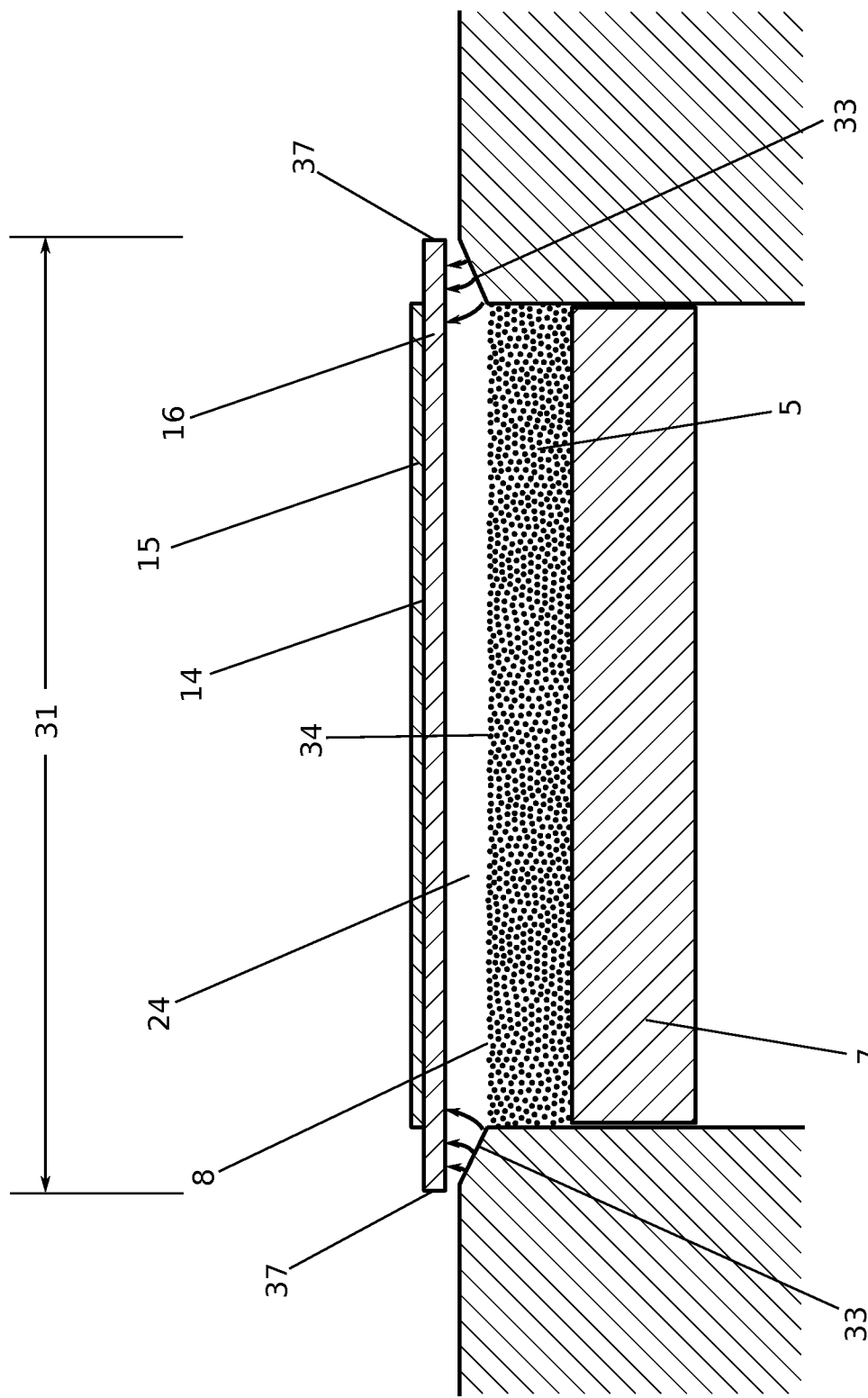

FIG. 10B depicts using an electrode assembly 14 that has a span 31 longer than the width 45 of powder bed reservoir 32. In this depiction, edges powder bed reservoir 32. In this depiction, edges 37 of electrode assembly 14 overlie edges 33 of powder bed reservoir 32. In addition, top edges powder bed reservoir 32. In addition, top edges 33 of powder bed reservoir 32 are angled outwardly. Angled edges 33 deflect powder inwards and keep powder in powder bed reservoir 32. The angled edges also create a curved electric field, which pushes powder back towards the center 34 of powder bed 5. The use of angled edges has been shown to work for both stationary leveling or in-motion leveling. In the case of a circular powder bed, the outer angled edge 33 should completely encircle powder bed 5. Another way to achieve the effect described with respect to FIG. 10B would be to angle the electrode assembly (both electrode and insulator) downwardly at the edges.

Figure 10C:
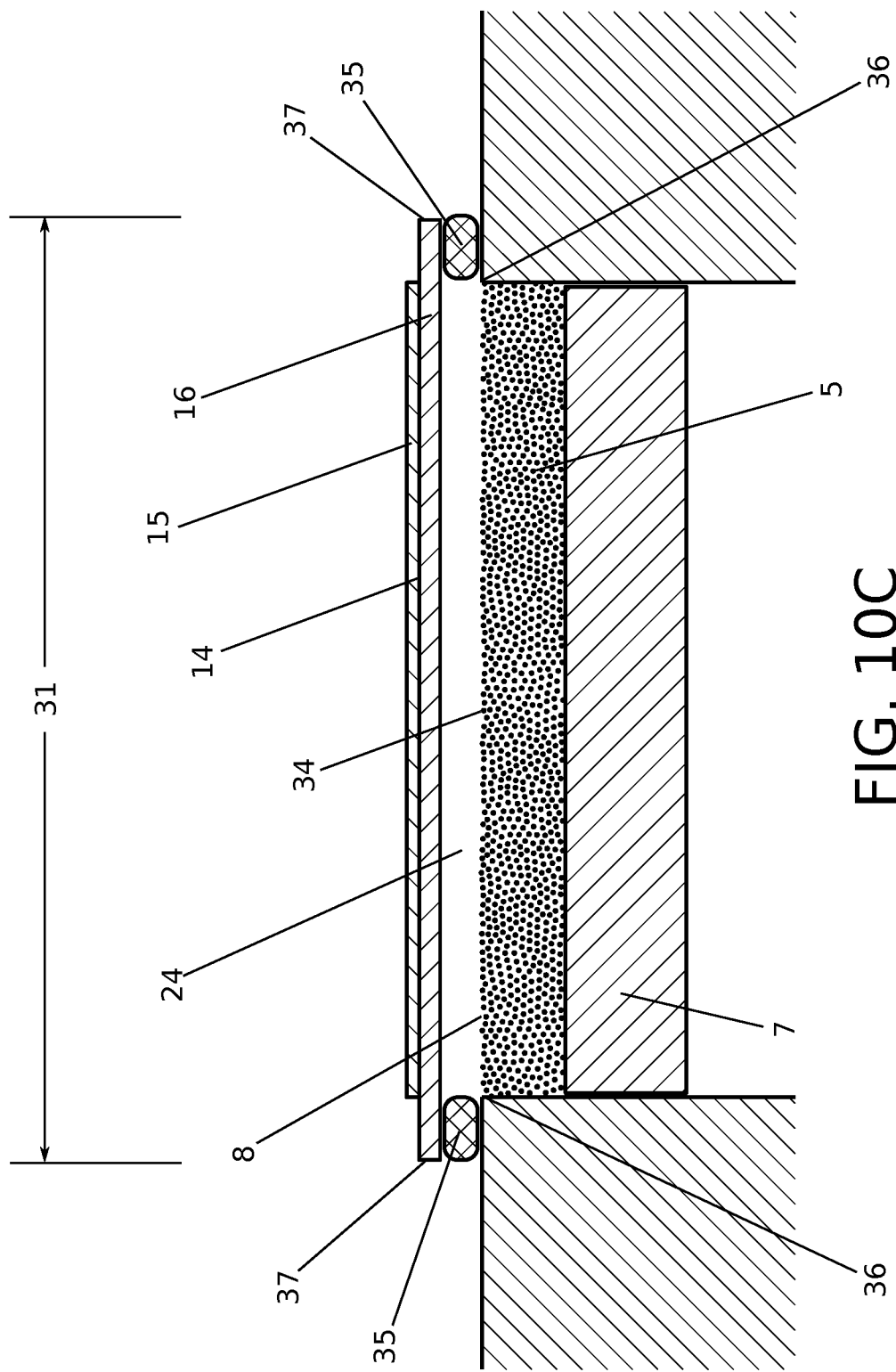

FIG. 10C shows the use of one or more seals 35 to limit escaping powder. As shown in FIG. 10C, one or more seals 35 are placed below electrode assembly 14 at its outer edges and the edges of powder bed 5. One or more seals 35 are fixed to lip 36 of powder bed reservoir 32 or it could be fixed to insulator 16. Seal 35 prevents powder from exiting the powder bed through edges 37 of electrode assembly 14. The one or more seals 35 can be made out of conductive material to create a desirable electric field shape similar to angled edges 33 discussed above.

Another solution to limiting powder escaping from edges 37 of electrode assembly 14 is to actuate the electrode assembly downward and apply the voltage only when the electrode assembly is in the downward position. This solution is shown in FIG. 10D and is a good option for stationary leveling. In this system and method, electrode assembly 14 is positioned over the powder bed. Electrode assembly 14 is then moved downward to its effective distance from top surface 8 of powder bed 5. This can be done via a motor, solenoid or some other actuator, including a mechanical positioner. Electrode assembly 14 is then pressed against edge 33 of powder bed reservoir 32 forming a powder oscillating region 24*a*. A high voltage alternating-current signal is applied between electrode 15 and powder bed 5 and powder oscillates within region 24*a*. Because no powder can escape at assembly edges 37, powder bed 5 is leveled accurately.

Figure 10E:
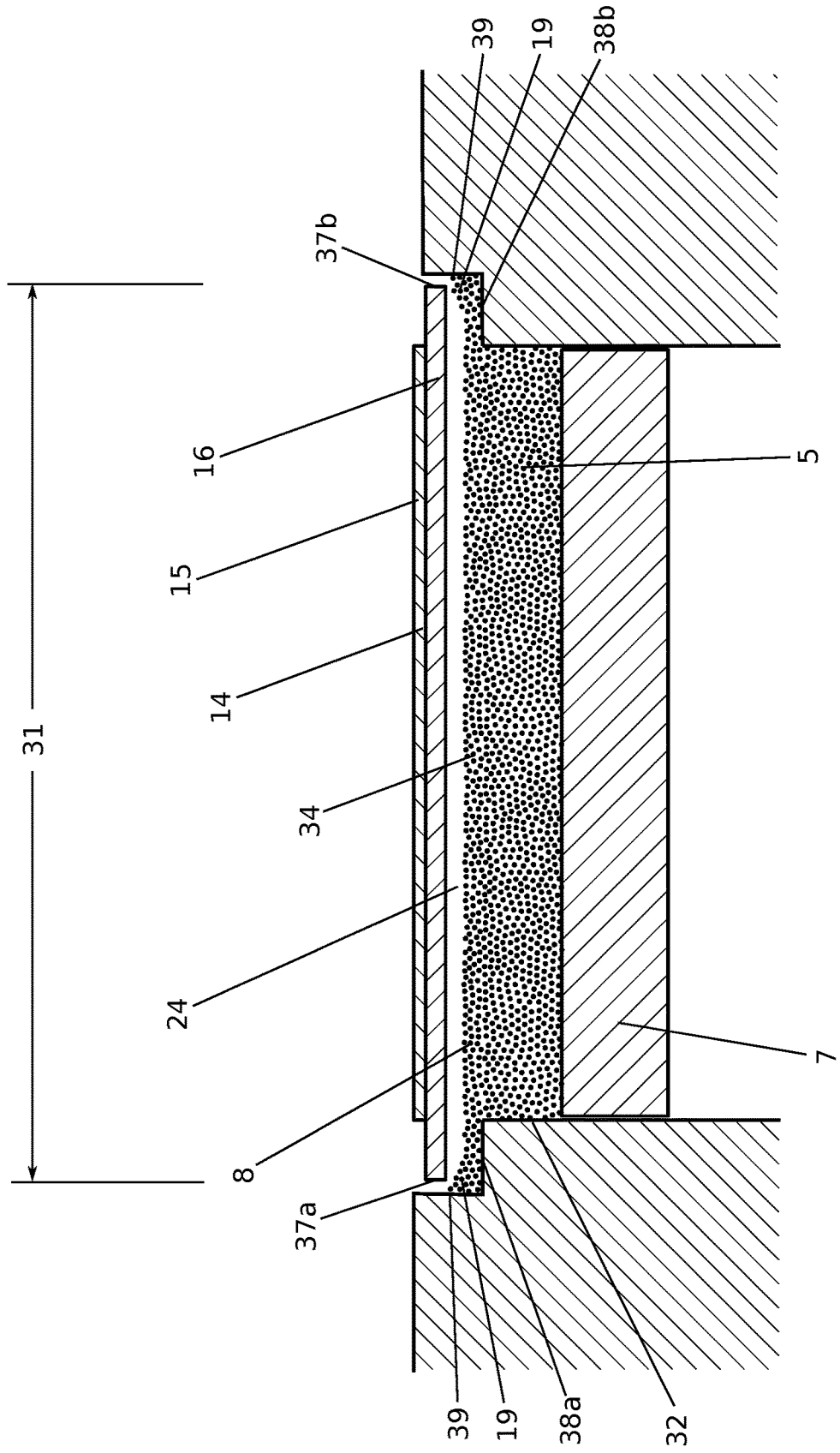

Another enhancement to the embodiment systems and methods entails recessing electrode assembly below the top of powder bed reservoir 32. This enhancement solution is shown in FIG. 10E and would work for both stationary and in-motion leveling. FIG. 10E shows electrode assembly having opposing edges 37*a*, 37*b* and each of electrode assembly edges 37*a*, 37*b* being seated in respective recesses 38*a*, 38*b* of powder bed reservoir 32. For systems and methods using in-motion leveling recesses 38*a*, 38*b* could be a notch or groove within which edges 37*a*, 37*b* of electrode assembly 14 respectively travel. As shown in FIG. 10E, powder 19 would accumulate about the side wall 39 of recesses 38*a*, 38*b* proximate the edges 37*a*, 37*b* of electrode assembly 14 as electrode assembly 14 travels in recesses 38*a*, 38*b*. In stationary leveling configurations, electrode assembly 14 is lowered into recesses 38*a*, 38*b* as discussed above with respect to FIG. 10D.

For optimum operation, the electrode should be protected from the build object warping upwards and into it. The part can cause damage to the electrode assembly by scraping or tearing the insulator or electrode if this occurs. Tests on prototype systems indicated that one way to protect the electrode from part warping is to recess the electrode behind a reinforced structure to prevent the part from impacting the electrode. Instead, the part will only impact the reinforced structure. This reinforced structure preferably takes the form of a bar or plate positioned on either side of the electrode assembly such that any part warping into the path of the electrode will first strike the reinforced structure when the electrode assembly is translated over the powder bed. For the same reason, the insulator should be a strong, wear-resistant material that will resist scratching due to contact with a warped part.

In the case where the electrode assembly moves while the electric field is applied, the electrode assembly carriage can move in a straight line across powder bed or it can sweep across the powder in orbital fashion (like the second hand over a watch dial). In the case of an orbiting radially extending electrode assembly the electrode and shielding insulator should be wedge-shaped. This is to ensure constant leveling across the bed. If a rectangular electrode is used, then the bed will be lower at locations closer to the center axis of rotation of the electrode assembly. Similarly, if the electrode consists of a series of tubes, the tubes should be arranged in fanned-out configuration originating from the central axis of rotation of the recoater Also, an electrical slip ring for high voltage must be utilized to carry voltage to the electrode because the recoater arm is continuously rotating. The slip ring allows electrical energy to be transmitted through a rotating connection.

In contrast to prior art recoating systems and methods, the embodiment methods and systems discussed herein offer distinct advantages. One advantage is that the inventive systems and methods allow for 3-D build creation without having to dispense a surfeit of powder. With recoating systems using scrapers or rollers, an excess of powder must be dispensed in order ensure 100% powder coverage. This is because when rollers and scrapers are used, it is almost impossible to measure exactly the right amount of powder to be spread over the bed. For this reason, with prior art recoating techniques an excess of powder is dispensed on the powder bed. The excess powder can be recovered, but it is contaminated with byproducts from the printing process (oxides, metal ejecta from the melt pool, etc). Ideally, only an amount of powder actually needed to form the next layer should be dispensed. A system feedback element indicating whether the powder bed, after new powder has been dispensed and leveled, is at the correct height could provide the necessary information to the machine's control system as to whether the amount of dispensed powder was proper.

Figure 12A:
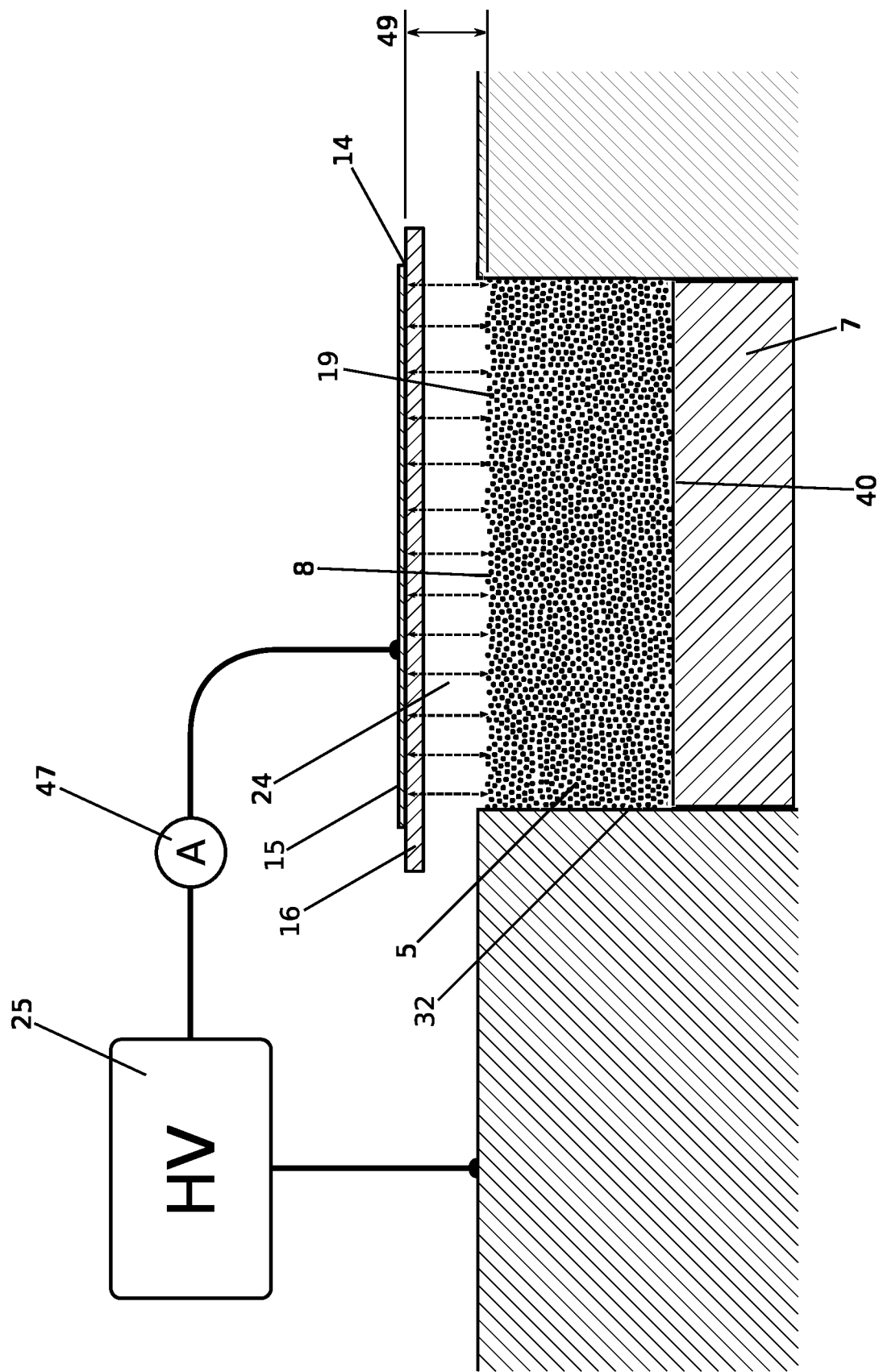
FIGS. 12A-12B depict an embodiment of the present invention capable of measuring the height of a powder bed for use in closed-loop feedback systems.
Figure 12B:
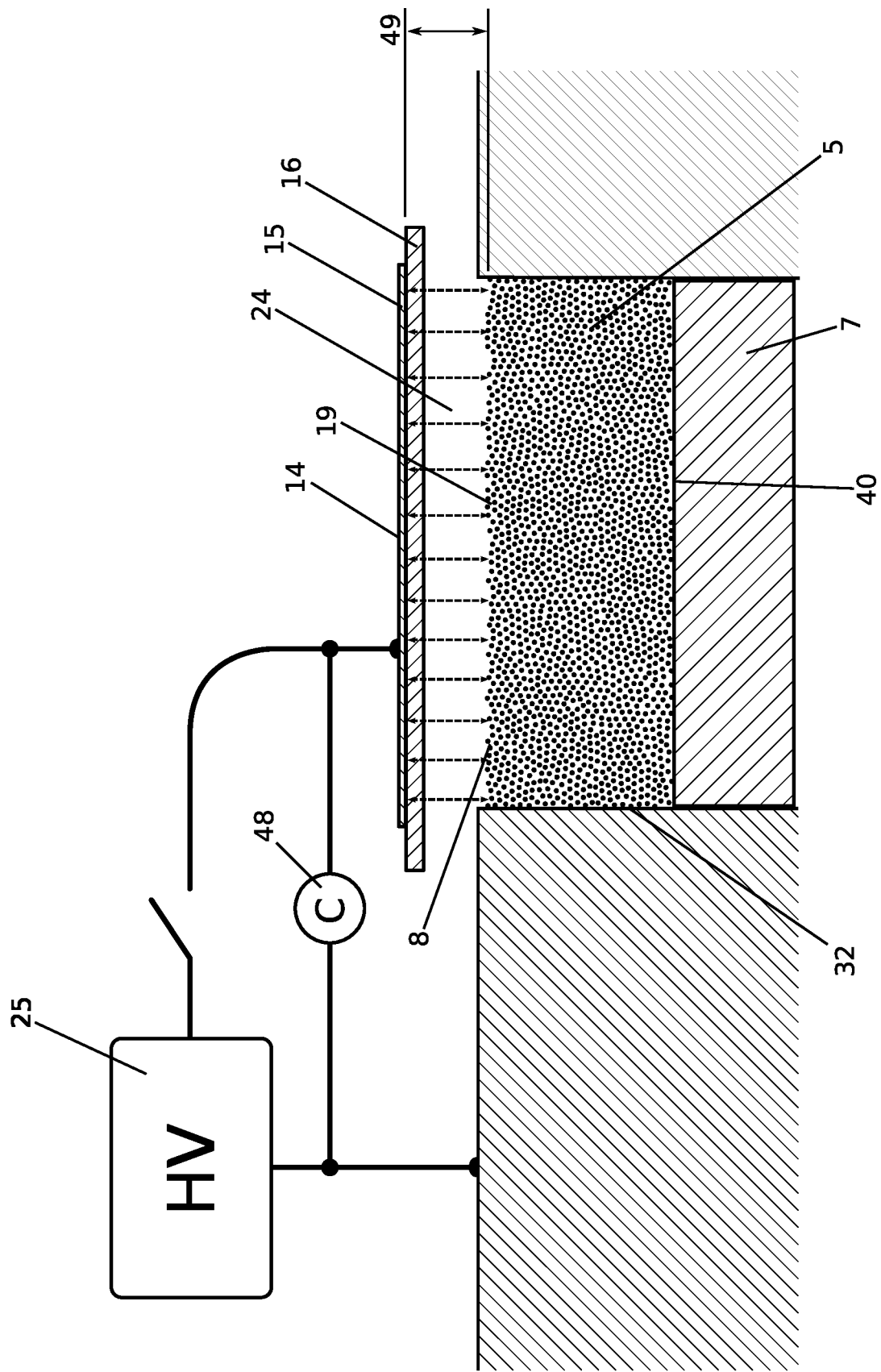
Figure 13:
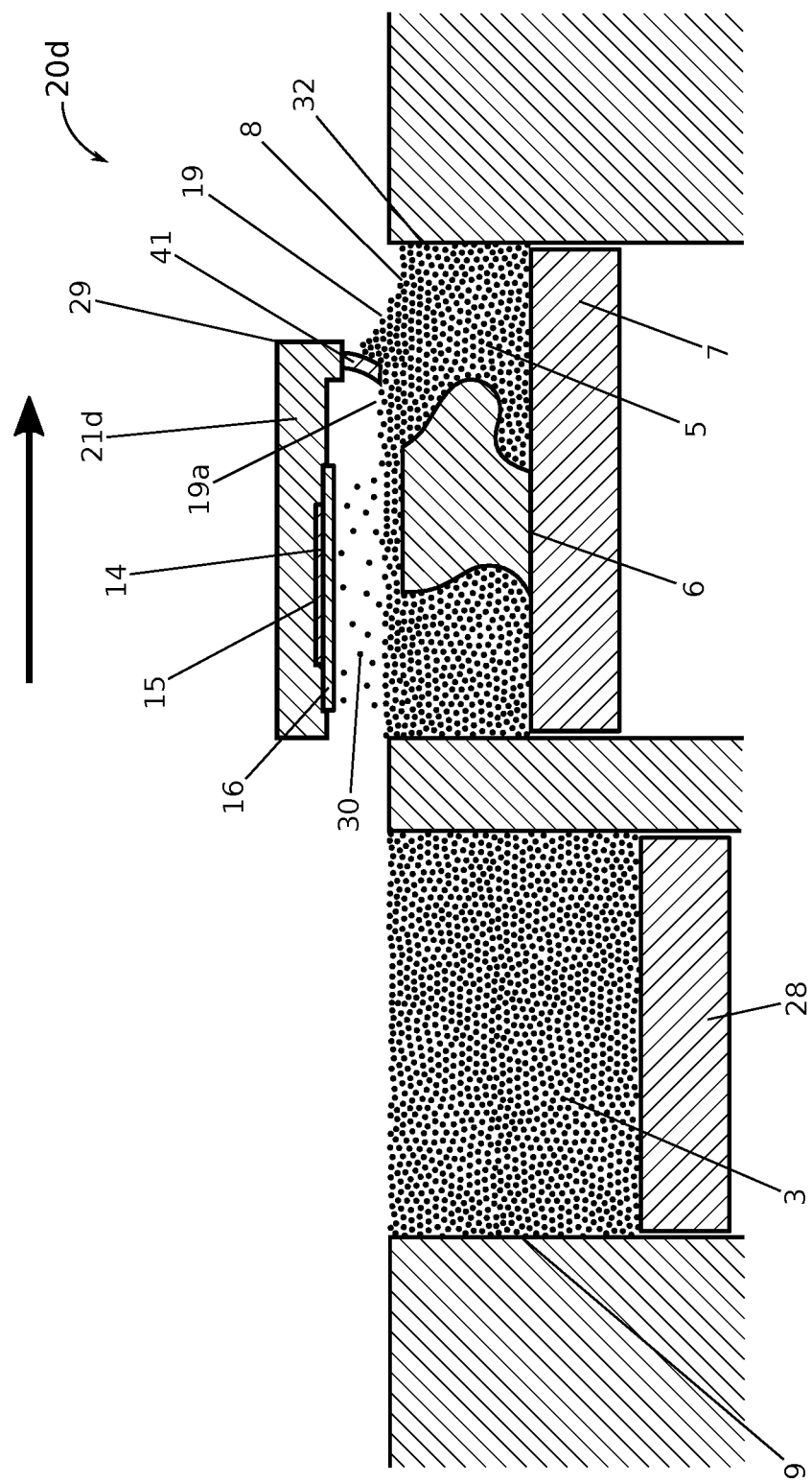
FIG. 13 depicts a present invention, embodiment powder recoater system employing a scraper in combination with a high voltage alternating current signal applied between the electrode and the powder bed and utilized in a method whereby the recoater electrode is in motion across the powder bed.

The electrode assembly of the present invention could be used to provide that feedback element without any extra components or sensors other than a small amount of additional circuitry. In this respect, the electrode itself can be used to measure the current bed height. Unlike the case with contact or air and gas leveling techniques, with the electrode leveling system disclosed herein, a capacitor having a capacitance is formed between the electrode and powder bed. That capacitance is dependent on the distance between the electrode and powder bed. Thus, the powder bed height can be determined by simply measuring the capacitance between the electrode and the bed. FIG. 12A shows an exemplary configuration of such a measurement system wherein the current flowing between high-voltage supply 25 and electrode 15 is measured by ammeter 47. Since high-voltage supply 25 provides an alternating current to electrode 15, the amplitude of this current is directly related to the capacitance between electrode 15 and powder bed 5. Thus, the current measured by ammeter 47 can be used to determine distance 49 between electrode 15 and powder bed 5. The relationship between distance 49 and current measured by ammeter 47 can be calculated by first-principles and this calculation will be apparent to those skilled in the art. However, in practical implementations of the system, some degree of calibration will be required to account for manufacturing tolerances, variance in electrical properties of the insulator, high voltage supply, etc. Alternatively, as shown in FIG. 12B an auxiliary capacitance meter circuit 48 can be connected in parallel with high voltage supply 25 to directly measure the capacitance between electrode 15 and powder bed 5. This capacitance measurement can then be used to calculate distance 49 between electrode 15 and powder bed 5. Note that the high voltage supply 25 should typically be disconnected or disabled while capacitance meter 48 is taking a measurement. Similarly, it is likely that capacitance meter 48 would need to be disconnected from the system when high voltage is applied to electrode 15 to avoid damage. The capacitance measurement can be used as an input make one or more adjustments to the system. Such adjustment could be the addition of more powder to the powder bed or raising or lowering the build platform to adjust the height of the top surface of the powder bed. Hence, all that is needed to implement the feedback loop is a capacitance sensor that provides an input signal to the system controller that outputs a control signal to the system componentry in response to that input. Such componentry includes but is not limited to the build platform height adjustment mechanism or the powder dispenser.

In another respect the current measurement between the electrode and powder bed can be used as an input to adjust voltage applied to the electrode for in-motion electrode assembly embodiments. By way of background, while the electrode is moving and applying an electric field to the powder, only the powder from the last one or two applied layers will be oscillating and other previously applied layers will remain undisturbed. Also, some powders are lighter or smaller than others and are therefore affected by the electrode more. Applied voltage should be tailored depending on the powder used. This makes the field voltage selection important, particularly in the case of an in-motion electrode assembly. With stationary-leveling configurations, the voltage is not so critical because powder should not be able to escape around the edges of the electrode. Therefore, for in-motion electrode applications, a way to adjust the voltage for different materials should be included as part of the build system. This adjustment could also be made by way of using current measurement as an input to roughly determine the amount of powder material oscillating and a voltage adjustment made based upon the sensor signal output by virtue of the current flow sensed.

Figure 11:
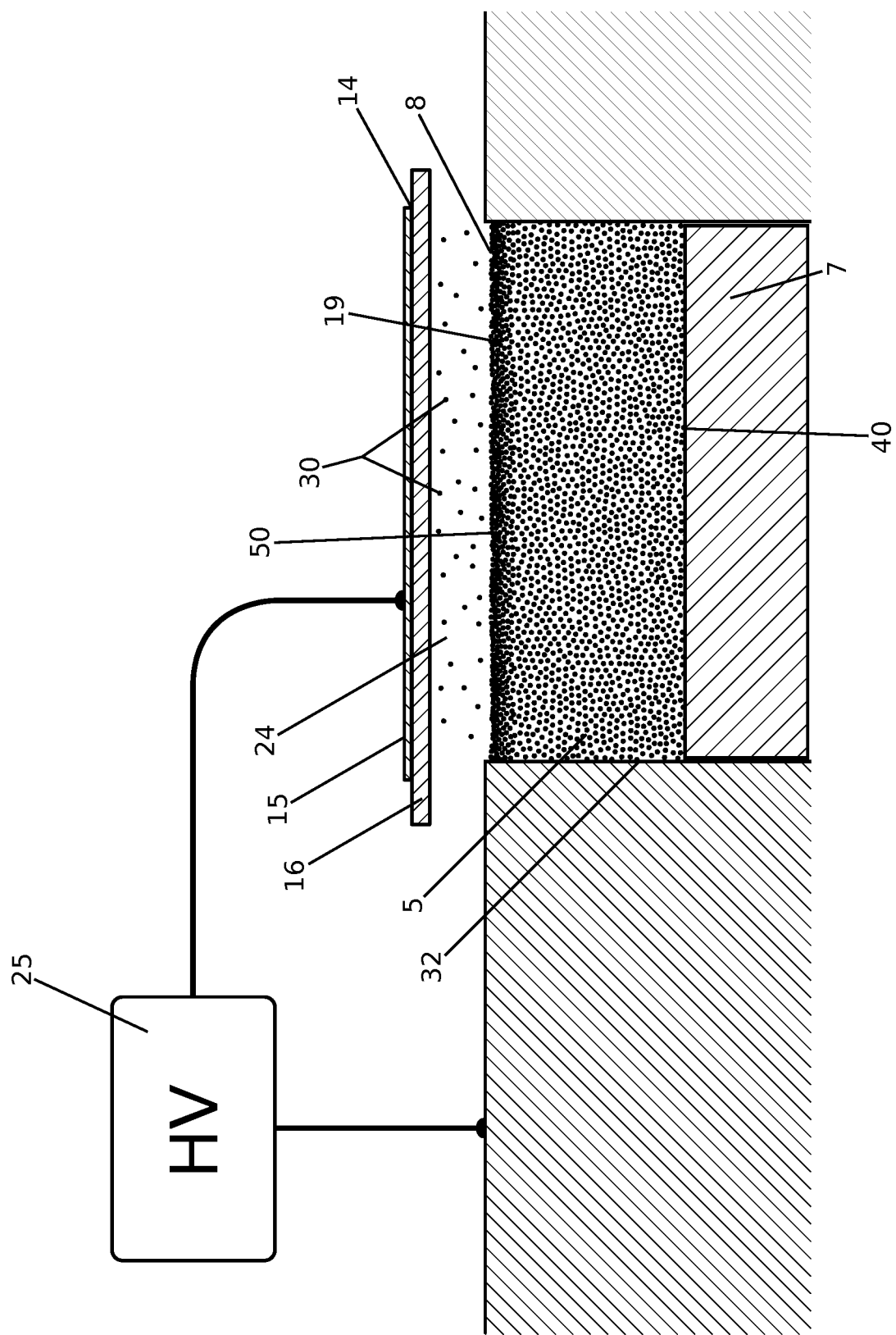
FIG. 11 depicts the beneficial localized compaction of the top layers of the powder bed resulting from using the present invention systems and methods.

An unexpected advantage of the present invention system and methods is the localized compaction of powder that occurs during the leveling phase at the top of the powder bed where fusion is taking place. This resulting effect is depicted in FIG. 11. In FIG. 11, the localized compacted layer is labeled with reference numeral 50. Rollers and scrapers also tend to pack the powder in the powder bed during the leveling process. This compaction is important for ensuring high density material in the final part. A few prior art references discuss the application of high-strength DC fields to process nonconductive powders to compact them, through and through, for processing. However, none of the prior art patents discuss the localized compaction involving only the top surface layers 50 of the powder bed that was seen in prototype embodiment systems testing the invention.

The present invention systems and methods can be used for systems and method for powder bed fusion, laser powder bed fusion, electron beam melting, selective laser sintering and binder jetting. The inventive systems and methods can also be used for handling glass microspheres. Glass microspheres are used in the pharmaceutical industry for delivering medicine to targeted location and in other industries for creating precise gaps between stacks of layered material. Glass microspheres tend to break when handled using conventional methods. The invention could result in less breakage, allowing for more 3D printing applications involving glass microspheres.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application.

What is claimed is:

1. A system for recoating a powder bed, the system comprising:
   a build platform holding a powder bed having a top surface, the top surface having a plurality of powder bed particles;
   a carriage including a brush, the carriage movable over the top surface of the powder bed;
   an electrode assembly including an electrode and a non-conductive dielectric shield;
   a voltage supply in electrical communication with the powder bed and the electrode;
   the brush configured to brush the top surface of the powder bed when the carriage moves in a direction over the powder bed;
   the electrode assembly being positionable over the powder bed after the brush has brushed the top surface of the powder bed;
   the non-conductive dielectric shield being located between the electrode and the top surface of the powder bed when the electrode assembly is positioned over the powder bed; and the voltage supply configured to produce a high voltage alternating current signal that creates an alternating electric field between the electrode and the powder bed for causing the plurality of powder particles of the top surface of the powder bed to oscillate in a region between the non-conductive dielectric shield and the top surface of the powder bed.

2. The system of claim 1 wherein:
the electrode assembly is mounted on the carriage behind the brush relative to the direction of motion; and
the carriage is configured to position the electrode assembly over the powder bed after the brush has brushed the top surface of the powder bed.

3. The system of claim 1 wherein:
the powder bed is contained in a powder bed reservoir having a width and outwardly angled edges;
the electrode assembly has a span; and
the span of the electrode is longer than the width of the powder bed reservoir.

4. The system of claim 1 wherein:
the powder bed resides in a powder bed reservoir having one or more top edges; and
the electrode is configured to be positioned over the powder bed in a downward motion and brought in contact with the one or more top edges of the powder bed reservoir before the voltage supply produces the high voltage alternating current signal.

5. The system of claim 1 wherein:
the electrode assembly has one or more outer edges;
the powder bed resides in a powder bed reservoir having one or more top edges;
each of the one or more top edges include a recess; and
the one or more outer edges of the electrode are configured to be placed in the one or more recesses of the one or more top edges of the powder bed reservoir before the voltage supply produces the high voltage alternating current signal.

6. The system of claim 1 further including:
a sensor configured to detect a level of capacitance between the electrode and powder bed and to output an electric signal based upon the capacitance level detected; and
a controller configured to receive the electric signal output by the sensor and to output a system adjustment signal based upon the received electric signal from the sensor.

7. The system of claim 1 further including:
an ammeter configure to measure a level of current flowing between the high-voltage supply and the electrode and to output an electric signal based upon the level of current measured; and
a controller configured to receive the electric signal output by the ammeter and to output a system adjustment signal based upon the received electric signal from the ammeter.

8. The system of claim 1 wherein:
the electrode assembly has one or more outer edges;
the powder bed resides in a powder bed reservoir, the powder bed reservoir has one or more lips; and
a seal is disposed between each of the one or more outer edges and the one or more lips.

9. The system of claim 8 wherein the seals are made of conductive material.

10. A system for recoating a powder bed, the system comprising:
a build platform holding a powder bed comprising a top surface having a plurality of powder bed particles;
an electrode assembly including an electrode and a non-conductive dielectric shield;
a brush on a carriage, the carriage movable in a direction over the top surface of the powder bed and the brush configured to brush the top surface of the powder bed when the carriage is in motion;
a voltage supply in electrical communication with the powder bed and the electrode;
the powder bed being electrically grounded;
the electrode assembly being positionable over the powder bed, such that when the electrode assembly is positioned over the powder bed, the non-conductive dielectric shield is located between the electrode and the top surface of the powder bed; and
the voltage supply configured to produce a high voltage alternating current signal that causes an alternating electric field between the electrode and the powder bed.

11. The system of claim 10 wherein:
the electrode assembly is mounted on the carriage behind the brush relative to the direction of motion; and
the carriage is configured to position the electrode assembly over the powder bed after the brush has brushed the top surface of the powder bed.

12. The system of claim 10 wherein:
the powder bed is contained in a powder bed reservoir having a width and outwardly angled edges;
the electrode assembly has a span; and
the span of the electrode is longer than the width of the powder bed reservoir.

13. The system of claim 10 wherein:
the powder bed resides in a powder bed reservoir having one or more top edges; and
the electrode is configured to be positioned over the powder bed in a downward motion and brought in contact with the one or more top edges of the powder bed reservoir before the voltage supply produces the high voltage alternating current signal.

14. The system of claim 10 wherein:
the electrode assembly has one or more outer edges;
the powder bed resides in a powder bed reservoir having one or more top edges;
each of the one or more top edges include a recess; and
the one or more outer edges of the electrode are configured to be placed in the one or more recesses of the one or more top edges of the powder bed reservoir before the voltage supply produces the high voltage alternating current signal.

15. The system of claim 10 further including:
a sensor configured to detect a level of capacitance between the electrode and powder bed and to output an electric signal based upon the capacitance level detected; and
a controller configured to receive the electric signal output by the sensor and to output a system adjustment signal based upon the received electric signal from the sensor.

16. The system of claim 10 further including:
an ammeter configured to measure a level of current flowing between the high-voltage supply and the electrode and to output an electric signal based upon the level of current measured; and
a controller configured to receive the electric signal output by the ammeter and to output a system adjustment signal based upon the received electric signal from the ammeter.

17. The system of claim 10 wherein:
the electrode assembly has one or more outer edges;
the powder bed resides in a powder bed reservoir, the powder bed reservoir has one or more lips; and
a seal is disposed between each of the one or more outer edges and the one or more lips.

18. The system of claim 17 wherein the seals are made of conductive material.

\* \* \* \* \*